(12) United States Patent
Hausman et al.

(10) Patent No.: US 7,774,247 B2
(45) Date of Patent: Aug. 10, 2010

(54) COMPUTER TRADING OF INTERESTS

(75) Inventors: Andrew Hausman, Summit, NJ (US); Karen D. Tannenbaum, New York, NY (US); Paul Brian Beatty, Jr., Garden City, NY (US); Lawrence C. Waldorf, Staten Island, NY (US); Alan Dweck, Turramurra (AT); Anish Malhotra, Middlesex (GB); Guy Mock, Tokyo (JP); Richard Anthony Lawson Braham, London (GB)

(73) Assignee: Bloomberg L.P., New York, NY (US)

( * ) Notice: Subject to any disclaimer, the term of this patent is extended or adjusted under 35 U.S.C. 154(b) by 597 days.

(21) Appl. No.: 11/087,775

(22) Filed: Mar. 23, 2005
(Under 37 CFR 1.47)

(65) Prior Publication Data
US 2006/0080214 A1    Apr. 13, 2006

Related U.S. Application Data

(63) Continuation of application No. 10/882,096, filed on Jun. 30, 2004.

(60) Provisional application No. 60/484,168, filed on Jun. 30, 2003.

(51) Int. Cl.
*G06Q 40/00* (2006.01)
(52) U.S. Cl. .................... 705/35; 705/37; 715/526
(58) Field of Classification Search ............... 705/35, 705/37; 715/526
See application file for complete search history.

(56) References Cited

U.S. PATENT DOCUMENTS

| | | | |
|---|---|---|---|
| 5,168,446 A | 12/1992 | Wiseman | |
| 5,375,055 A | 12/1994 | Togher et al. | |
| 6,304,858 B1 * | 10/2001 | Mosler et al. | 705/37 |
| 6,343,278 B1 | 1/2002 | Jain et al. | |
| 6,421,653 B1 * | 7/2002 | May | 705/36 R |
| 2002/0042765 A1 | 4/2002 | Dawson | |
| 2002/0111896 A1 | 8/2002 | Ben-Levy et al. | |
| 2002/0178104 A1 | 11/2002 | Hausman | |
| 2003/0009415 A1 * | 1/2003 | Lutnick et al. | 705/37 |

FOREIGN PATENT DOCUMENTS

| | | |
|---|---|---|
| WO | WO 01/16830 | 3/2001 |
| WO | WO 01/50776 | 7/2001 |

* cited by examiner

*Primary Examiner*—Hani Kazimi
*Assistant Examiner*—Samica L Norman
(74) *Attorney, Agent, or Firm*—Frank J. DeRosa; Frommer Lawrence & Haug LLP

(57) ABSTRACT

The invention provides systems, methods, and programs for improved computer trading of financial and other interests, including improvements in the making, acceptance, and control of proposals for transactions in interests. Among improvements provided by the invention are the presentation of terms of proposed transactions to trading parties in terms selected or otherwise designated by the trading parties. For example, terms of proposed transactions may be displayed in present or future values, such as in straight or split amounts for forward swap agreements. Prices in currency exchanges may be expressed in terms of any of the involved currencies. Improvements further include improved means for changing terms of proposed transactions, and especially groups or sets of proposed transactions; restrictions on repeated acceptance of transaction proposals; trading by users on each other's behalf; and improved display of transaction information associated with fellow traders.

6 Claims, 23 Drawing Sheets

1<GO> to update.  2<GO> to use default values.  Curncy TSFP

User Term Settings

Swap Term:   EURSN   User:   JANE Q. TRADER

Requirements

| | | | Multiples of |
|---|---|---|---|
| Price Increment: | 0.00385 | > or = | 0.001 |
| Minimum Price: | -100.00000 | < or = | -100.000 |
| Maximum Price: | 100.00000 | > or = | 100.000 |
| 2-Way Price Spread: | 0.00500 | > or = | 0.001 |
| Movement Rate: | 0.00500 | > or = | 0.001 |

— 153

All size values are in millions.

| | | | Multiples of | Multiples of |
|---|---|---|---|---|
| Size Increment: | 1 | > or = | | 1 |
| Minimum Trade Size: | 1 | < or = | | 1 |
| Minimum Size: | 1 | > or = | | 1 |
| Maximum Size: | 999000 | | | 999000 |
| Default Order Size: | 50 | | | 1 |

— 155

— 157

<MENU> to return

Australia  61 2 9777 8600    Brazil  5511 3048 4500    Europe  44 20 7330 7500    Germany  49 69 920410
Hong Kong  852 2977 6000  Japan 81 3 3201 8900  Singapore  65 6212 1000  U.S.  1 212 318 2000   Copyright 2003 Bloomberg L.P.

Bloomberg
PROFESSIONAL

FIG. 5

EURTN=P
Bid -1.145  Ask -1.130

| Markets | Options | Suspend Orders | Curncy TSFM |
|---|---|---|---|

09:37  Current Spot: 1.1419 / 1.1422

TRADING PARTY A (123456)

EUR/USD FX SWAPS

Page 1/1

| Bid | Offer | Period |
|---|---|---|
| € 50M  -1.010 / | -1.140  € 50M. | EURON |
| € 50M  -1.160 / |  | EURTN |
| € 1M  -3.900 / |  | EURSN |
| € 50M  -5.470 / | -5.320  € 50M. | EUR1W |
| *€ 1M -10.940 / | -10.640  €  1M* | EUR2W |
|  |  | EUR3W |
|  |  | EUR1M |
|  |  | EUR2M |
|  |  | EUR3M |
|  |  | EUR4M |
|  |  | EUR5M |
|  |  | EUR6M |
|  |  | EUR9M |
|  |  | EUR1Y |

Add OFFER
EUR/USD  SN
07/01/2003 - 07/01/2003

Price            Size
[ - ] -3.85 [ + ]    [ 0 M ] [ EUR ] [ 1 M ]

[ Y ] Straight   [ Y ] Min. Trade/Size Increment
[ Y ] All or None    [ 1 M ]

Reserve      Reserve Scaleback
[ - ] +0.000 [ + ]    [ 0.0000 ]

Pegging Pegging:
If SPOT moves by:    [ 0.000 ]
Move Order by:

[ Place ]              [ Close ]

© Copyright 2003 Bloomberg L.P.

FIG. 6

```
<HELP> for explanation.                              6 fxsbig Govt        FXPR
<GO> to updaet. 2<GB> to use default values.
```

User Term Settings

Swap Term:   CAD3M    User:    PETER CHONG

|   |   | Requirements |   |   |
|---|---|---|---|---|
| Price Increment: | 0.01000 | Multiples of | 0.010 | |
| Minimum Price: | -999.00000 | > or = | -999.000 | |
| Maximum Price: | 999.00000 | < or = | 999.000 | |
| 2-Way Price Spread: | 0.01000 | > or = | 0.010 | |
| Movement Rate: | 0.01000 | > or = | 0.010 | |
| Default Currency: | CAD | *Size values are in millions | | |

|   | CAD | USD |   | CAD | USD |
|---|---|---|---|---|---|
| Size Increment: | 1 | 1 | Multiples of | 1 | 1 |
| Minimum Trade Size: | 1 | 1 | Multiples of | 1 | 1 |
| Minimum Size: | 1 | 1 | > or = | 1 | 1 |
| Maximum Size: | 0 | 0 | < or = | 10000 | 999000 |
| Default Order Size: | 1 | 1 | > or = | 1 | 1 |
| Size Preference: | None | | | | |

871

<MENU> to return

<HELP> for explanation.
1<GO> to update. 3<GO> to delete.

6 fxsbig Govt    FXPR

FX SWAP Term Setup
USD-CAD

Swap Term:            CAD6M

Price Increment:         0.01000
Minimum Price:        -999.00000
Maximum Price:         999.00000
2-Way Price Spread:      0.01000
Movement Rate:           0.01000
Price Point Value:       0.000100
Price Format:          %+7.2f
Split Index:           CD0006M  ← 874

Currency Symbol:       [C] [63]
Split:                 [X]

Object ID    CAD6M=P  5633
Alt ID:      CD+  6M  8824
IMM Date:    0/ 0/ 0000   ← 875

CAD           USD
            1             1
            1             1
         10000        999000
            1             1

Size Increment:
Minimum Size:
Maximum Size:
Default Order Size

*Size values are in millions

<MENU> to return
Last updated by WALDORF, LARRY at 14:45 3/17/2004

FIG. 9C

| FX Swaps ORDERS (ALL) | Page 1/1 | | TEST PowerMatch FX ORDERS | | Curncy TSFO Page 1/1 |
|---|---|---|---|---|---|
| | | Side | Placed By | Seq# | Status |
| 1) ALL / USD | | S/B | TRADER A | 138 | open |
| 2) USD / CAD | | S/B | TRADER A | 137 | open |
| 3) USD / CHF | | S/B | TRADER A | 136 | open |
| 4) EUR / USD | | S/B | TRADER A | 135 | open |
| 5) GBP / USD | | B/S | TRADER A | 134 | open |
| 6) USD / JPY | | B/S | TRADER A | 133 | open |
| | | B/S | TRADER A | 132 | open |

CANCEL   atch FX Hotline
WARNING: MONITOR IS CURRENTLY SUSPENDED  20-7330-7846
— 210

<HELP> for explanation.
<GO> to update commission rates 6 fxsbig Govt        FXP

Commission Rates

| Swap Terms ( days ) | Aggressor ( USD ) | Initiator ( USD ) |
|---|---|---|
| 1 - 6 | 0.50 | 0.50 |
| 7 - 29 | 1.00 | 1.00 |
| 30 - 60 | 2.50 | 2.50 |
| 61 - 90 | 3.50 | 3.50 |
| 91 - 180 | 4.50 | 4.50 |
| 181 - 270 | 5.50 | 5.50 |
| 271 - 365 | 7.50 | 7.50 |
| 366 and up | 0.00 | 0.00 |
| Minimum Brokerage | 0.00 | 0.00 |

Dealing Code: AIBN
FIX Target ID:

View Only: N
Monthly Billing: N
Anti-Sniping vs 0 — 227
 None
 Aggressor
 World

TDF Feed: N
FIX API Feed: N
FIX Failure Option 2

<MENU> to return

Last updated by CRAWLEY, DEAN at 12:46 3/1/2003

FIG. 11

| Markets ▸ | Options ▸ | Suspend Orders | Govt TSFM |
| --- | --- | --- | --- |
| | | TEST EUR/USD FX SWAPS | |

User specified trading day ended: suspending orders

Australia 61 2 9777 8600    Brazil  5511 3048 4500    Europe 44 20 7330 7500    Germany 49 69 920410
Hong Kong 852 2977 6000  Japan 81 3 3201 8900  Singapore 65 6212 1000  U.S. 1 212 318 2000  Copyright 2003 Bloomberg L.P.
G457-363-0 27-Jun-03 17:48:02

Bloomberg
PROFESSIONAL

FIG. 13

| Screens ▶ | Options ▶ | | | | | Curncy TSFO |
|---|---|---|---|---|---|---|
| | | | | | | Page 1/1 |
| | | | | TEST PowerMatch FX ORDERS | | |
| BROWN RAYSMAN MILLSTEIN FELDER | | | | | | |
| Term | | | Size | Pts Side | Placed By | Seq# Status |
| 1) EUR2W | 7/1 | 7/15/03 | € 50M | -5.470 S/B | TRADER A | 135 Open |
| 2) EUR2W | 7/1 | 7/15/03 | € 50M | -5.320 B/S | TRADER A | 134 Open |
| 3) EUR1W | 7/1 | 7/ 8/03 | € 1M | -3.900 S/B | TRADER A | 136 Open |
| 4) EUR1W | 7/1 | 7/ 8/03 | € 1M | -3.835 B/S | TRADER A | 133 Open |
| 5) EURSN | 7/1 | 7/ 2/03 | € 50M | -1.160 S/B | TRADER A | 137 Open |
| 6) EURSN | 7/1 | 7/ 2/03 | € 50M | -1.140 B/S | TRADER A | 132 Open |
| 7) EURTN | 6/30 | 7/ 1/03 | € 50M | -1.010 S/B | TRADER A | 138 Open |

ORDER SUMMARY

PowerMatch FX ORDERS　　Curncy TSFO

| | | | Seq# 137 |
|---|---|---|---|
| EUR / USD | | | Ref ID EURUSD20030622013 |

Order:
- Last Update: 17:17:55
- Date: 6/26/03

Side  SELL/BUY  　　Status Open

Near Leg:
- Size: €50M

Far Leg:
- Size: €50M
- Pts: -1.160

Pegging:
- Inital Peg Spot: N/A
- Last Peg Spot: N/A
- Spot Moves
- Order moves

Reserve:
- Size: N/A
- Scaleback: N/A

Min Trade: €1M

Placed By: TRADER B FOR TRADER A — 255
Firm: FIRM A
Contact:

Term Info: EURSN

Near Date: 7/1/03
Far Date: 7/2/03

Australia 61 2 9777 8600　　Brazil 5511 3048 4500　　Europe 44 20 7330 7500　　Germany 49 69 920410
Hong Kong 852 2977 6000　Japan 81 3 3201 8900　Singapore 65 6212 1000　U.S. 1 212 318 2000　Copyright 2003 Bloomberg L.P.
G457-363-1 26-Jun-03 17:22:39

Bloomberg PROFESSIONAL

FIG. 15

Govt TSFP 293

```
Securities   Functions   Help
GRAB
1<GO> to update. 2<GO> to delete. 3<GO> order disclosure. 4<GO> credit sharing.
```

**FX SWAP FIRM SETUP
CUST # 280742
TRADING FIRM Z**

Cutomer Number:   280742

Contact Info
Contact:
Phone:                                    Fax:
Email 1:
Email 2:
Email 3:

6<GO>  to show commission rates            5<GO>  to set credit buckets

<MENU> to return

Last updated by                at 15:07 6/25/2003

Australia 61 2 9777 8600   Brazil 5511 3048 4500    Europe 44 20 7330 7500    Germany 49 69 9204410
Hong Kong 852 2977 6000    Japan 81 3 3201 8900  Singapore 65 6212 1000   U.S. 1 212 318 2000    Copyright 2003 Bloomberg L.P.
                                                                           G443-721-2  27-Jun-03 13:41:26

FIG. 17

Securities  Functions  Help
GRAB                                              Govt  TSFP

Credit Sharing Setup                          Page  1/ 1

Group Name    CREDIT GROUP A
              TRADING FIRM A

| 280742 | | | | | | | | | | |
|---|---|---|---|---|---|---|---|---|---|---|

<MENU> to return    * WHITE denotes the primary account.

Australia 61 2 9777 860     Brazil 5511 3048 4500              Europe 44 20 7330 7500     Germany 49 69 920410
Hong Kong 852 2977 6000   Japan 81 3 3201 8900  Singapore 65 6212 1000   U.S. 1 212 318 2000   Copyright 2003 Bloomberg L.P.
                                                                                              G516-49-3 24-June-03 11:04:48

Order Disclosure Setup

Securities  Functions  Help
GRAB                                    Govt  TSFP

Page 1/ 1

Disclosure Group A

Trading Firm A

Group Name

| 280742 | | | | | | | | | | | |

297

<MENU> to return      * WHITE denotes the primary account.

Australia 61 2 9777 860   Brazil 5511 3048 4500   Europe 44 20 7330 7500   Germany 49 69 920410
Hong Kong 852 2977 6000  Japan 81 3 3201 8900   Singapore 65 6212 1000  U.S. 1 212 318 2000   Copyright 2003 Bloomberg L.P.
G443-721-2 27-Jun-03 13:41:26

FIG. 19

COMPUTER TRADING OF INTERESTS

CROSS REFERENCE TO RELATED APPLICATION

The present application is a continuation of application Ser. No. 10/882,096, filed Jun. 30, 2004, now pending, the entirety of which is incorporated by reference herein.

This application claims the benefit of United States provisional patent application Ser. No. 60/484,168, "COMPUTER TRADING OF FINANCIAL INTERESTS," filed 30 Jun. 2003, the entire contents of which are hereby incorporated in full by this reference.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

This application contains material relating to the trading of financial and other interests. The trading of some interests is regulated, as for example by the United States Government, the various State governments, and other governmental agencies within the United States and elsewhere. The disclosure herein is made solely in terms of logical and financial possibility and advantage, without regard to possible statutory, regulatory, or other legal considerations. Nothing herein is intended as a statement or representation of any kind that any system, method or process proposed or discussed herein does or does not comply with any legal requirement whatsoever, in any jurisdiction; nor should it be taken or construed as doing so.

FIELD OF THE INVENTION

The invention relates to trading of financial and other interests, and in particular to systems, methods, and programs for improved computer trading of such interests.

BACKGROUND OF THE INVENTION

Examples of systems for computer trading of interests are disclosed in U.S. patent applications Ser. No. 09/584,045, filed 30 May 2000 and entitled ELECTRONIC TRADING SYSTEM FOR ELECTRICITY FORWARDS; Ser. No. 09/839,529, filed 20 Apr. 2001 and entitled PRICE CHANGE OF ORDERS FROM RESERVE IN AN ELECTRONIC TRADING SYSTEM; and Ser. No. 10/395,839, filed 24 Mar. 2003 and entitled VARIABLE PRICING FOR AND CONDITIONAL AVAILABILITY OF PROPOSALS FOR TRADING OF FINANCIAL INTERESTS; the entire disclosure of each of which is hereby incorporated herein by this reference.

SUMMARY OF THE INVENTION

The invention provides systems, methods, and programs for improved computer trading of financial and other interests. The invention is applicable to the trading of all types of interests, including present, future, and contingent interests such as spot, futures, options, swaps, and forwards contracts in, for example, equity instruments such as stocks; fixed income securities such as corporate, government, and municipal bonds; mortgages, loans, commercial paper and other debt instruments; energy and other commodities contracts, including for example precious metals; foreign exchange; pollution credits; and weather insurance.

The invention may be embodied in many types of computer systems for trading interests, for example a computer system comprising one or more computers connected to a plurality of trading party stations by a network to provide an electronic market or exchange for interests.

The invention provides improvements in the making, acceptance, and control of proposals for transactions in interests, and in the making of markets in interests.

Proposed transactions, as contemplated herein, can include both buy and sell orders, such as bids and offers, entered by initiating trading parties, and execution or acceptance orders resulting from, for example, hits or lifts entered by aggressing trading parties for previously-entered orders and proposed transactions. Proposed transactions may comprise any form of sale or exchange, such as straight sale, auction, or swap. Proposed transactions may be binding or negotiable, and may include requests for or indications of interest in trades, such as inquiries directed to specified potential counterparties or sets of counterparties. In some embodiments proposed transactions are executable upon acceptance by other users.

An embodiment of the invention provides for the presentation of terms of proposed transactions to trading parties in terms selected or otherwise designated by the trading parties. For example, a price term for a proposed trade associated with a future date may be expressed in terms of present, future, or other designated value(s). For example, in a system for trading of foreign currency forwards, a trader considering a proposed forward transaction may elect to have terms of the transaction displayed in straight, or current, amounts; in split, or forward amounts; or both, prior to determining whether to accept the proposal or execute the trade, or after the trade has been accepted and/or executed.

In such an embodiment the invention provides, for example, systems, methods, and computer programming for presenting terms for proposed transactions in forwards contracts for interests traded over a network, wherein a proposed transaction in a forward contract for an interest is displayed at a trading party station. The proposed transaction may be executable by a computer according to computer programming which provides for trading parties to aggress on proposals of other trading parties. The forward contract may be associated with, among other terms, a near date, a far date, and a notional amount of principal nominally to be paid at the far date of the contract. Displayed terms comprise a price displayed either as the notional amount, or an amount indicating a present value of the notional amount at the maturity date, or both, according to a selection made by a user of the trading party station.

In such embodiments a user may elect to entertain, e.g. by requesting or authorizing display at a display 32 associated with the user only of transaction proposals stated in the desired straight or split amounts, or by authorizing other trading parties to aggress on proposals entered by the user only when those trading parties agree to complete the transaction in such terms.

In another embodiment, a trading party may elect to have terms for proposed trades of interests presented and/or processed in various forms, including for example in terms of any of the interests involved. For example, in a system for trading foreign exchange interests, a trading party may designate that it wishes to have terms for proposed transactions stated and/or displayed in terms of any of the involved currencies, such as United States dollars (USD), euros (EUR), Canadian dollars (CAD), or other currencies.

In such embodiments the invention provides, for example, systems, methods, and computer programming for presenting terms for proposed transactions in currencies traded over a network, wherein a computer system provides for display at a trading party station terms for a plurality of proposed transactions between trading parties in at least two currencies. The proposed transaction may be executable by a computer according to computer programming which provides for trading parties to aggress on proposals of other trading parties. Displayed terms comprise prices stated in either of the currencies, in accordance with a selection made by a trading party.

The invention provides improved means for changing terms of proposed transactions, and especially groups or sets of proposed transactions, as for example for entry to a market or to keep proposed transactions up to date in a changing market. For example, the invention provides for incrementing terms of proposed transactions, such as price or quantity terms, by amounts previously designated by the trading party who proposed them. For example, the system can display a special interactive functional element, such as a selectable item or item, for use by a user of a trading party station. Selection of the item using an input device such as a mouse or other pointer causes a command to be issued to the trading system computer, the command causing the system to change all of the price, quantity, or other terms associated with pluralities of the user's and/or the trading party's proposed transactions. For example, selection of an arrow item "→" displayed on an interactive interface screen can cause price or quantity terms of all of a trading party's displayed proposed trades to be changed incrementally upward or downward, by an amount previously designated by the trading party or the system.

In such embodiments the invention provides, for example, systems, methods, and computer programming for processing terms for proposed transactions in interests traded over a network, wherein at least one computer receives proposals for transactions over a network from trading party stations. Terms for a plurality of transactions proposed by a trading party are displayed at a trading party station. The proposed transactions comprise a plurality of proposals for transactions in at least one interest, on at least one side of a market, and are executable by the at least one computer. The displayed terms comprise at least one item associated with each side of the market, the item being selectable at a trading party station. Upon selection of the item, terms are incremented for each of a plurality of transactions proposed by the user on the side of the market associated with the selected item. Terms may be incremented upward or downward in amounts which may be designated (set) by the computer, the trading party, or both.

The invention also provides tools for the protection of trading parties' orders, and/or for preventing the manipulation of the trading party and/or the relevant market. The invention provides, for example, for automatically or at the instruction of a trading party restricting the availability of a trading party's orders to repeated acceptance (e.g., repeated hitting or lifting of the trading party's bids and/or offers) by other trading parties, particularly where the trading party has more than one proposed transaction pending in a market. For example, where a trading party enters or has pending multiple orders in the same or different interests, such as different tenors of foreign exchange forwards, or where the trading party enters or has pending multiple reserve orders in a single interest, the trading party may designate one or more counterparties and in some embodiments a time period during which the counterparty(s) are to be restricted from accepting any further trades proposed by the trading party, after accepting a previous trade. This feature is useful, for example, in preventing "sniping" techniques used by some traders in repeatedly hitting or lifting offers of other traders, and in protecting traders who inadvertently leave orders pending in a rapidly changing market.

In such embodiments the invention provides, for example, systems, methods, and computer programming for processing terms for proposed transactions in interests traded over a network, wherein at least one computer receives over a network proposals for transactions from trading party stations. The at least one computer executes transactions in interests according to computer programming which provides for a first trading party to aggress on proposals of other trading parties and restricts the first trading party from aggressing, within a set period of time, on more than a set number of proposals for transactions in one or more interests proposed by a same other trading party. The time period and number of proposals may be designated or set by the computer system, by a trading party, or both. Individual trading parties may be targeted for restriction, or restrictions may apply to all trading parties, in accordance with designations of the user and/or the computer system. Restrictions may apply to repeated acceptance of proposals in the same or multiple interests. For example, the restrictions may apply to aggressing on multiple proposals for transactions in a same interest, where the proposals include transactions in interests having a quantity term, all or part of which is a reserve quantity associated with a proposal having a visible quantity, and the reserve quantity forming part of an executed transaction for all or part of the visible quantity. Restrictions may also apply, for example, to acceptances of forward contracts in foreign exchange, where the interests comprise a plurality of tenors associated with a single currency pair.

The invention also provides for trading by one trading party on behalf of, or in the name of, a second trading party. For example, a first user, which can be for example an administrative or trading user of a trading party station according to the invention, may enter transaction commands, such as proposed trades or attempts to hit or lift proposed transactions, which are associated with a second user of the same, or another, trading party station, for example, by means of an identification number corresponding to the second user provided to the trading system for association with terms of transactions proposed by the first user, so that, at least a first level of trade reporting, the second user is solely identified as the user entering the transaction command. In second or deeper levels of reporting, the first user may also be identified, for example, to assist in auditing and accounting.

In such embodiments the invention provides, for example, systems, methods, and computer programming for processing information related to transactions in interests between trading parties over a network, at least one of the trading parties comprising a plurality of associated users, wherein at least one computer identifies at one reporting level a user associated with a trading party as responsible for a communication related to a transaction in an interest, the transaction executable by at least one computer according to programming which provides for trading parties to aggress on proposals of other trading parties; and the at least one computer identifies at another reporting level another user associated with the same trading party as at least partially responsible for the communication. Communications may include, for example, terms for proposed transactions, commands for aggressing on transactions proposed by other trading parties, and/or other information relating to transactions in interests.

Reporting levels may include, for example, varying levels of confidentiality in trade reporting or disclosure. For example, a user may be identified as responsible for a communication in a display provided to parties to a completed transaction, or in a display provided openly to all trading parties, whether or not they were involved in a transaction, showing all completed transactions in a given market or during a given time period. In such embodiments another user may be identified as at least partially responsible for the communication at another level of reporting, for example in a more or less confidential display or printed report provided for clearance or accounting purposes.

In such embodiments an administrative or other user associated with a trading party may be authorized, or required, to authorize one user to act on behalf of another user, as for example to submit to the at least one computer communications related to transactions on behalf of another user associated with the trading party.

The invention further provides features for improved monitoring of markets. For example, in trading systems in which books of orders or other pluralities of transaction proposals are displayed to a trading party, an order comprising a changed term may be displayed in a highlighted manner, such as in a distinct color or flashing text, for a period of time after the term has been changed. For example, in a system in which books of proposed transactions are displayed in a first, or constant, color, such as white or amber, a new order or an order in which a price or quantity term is changed may be displayed in a second color, such as red, and/or in an intermittent, or flashing display, for a designated period of time, such as 1-30 seconds, following the changing of the term, which may include entry of a new order. After the designated highlighting period, the order terms may be displayed in the manner of other pending orders. The period of time in which new or changed orders are shown in highlighted form may be designated by the viewing trading party, by the trading system, or both.

In some embodiments of the invention, orders displayed in market or other views may be displayed or otherwise disclosed in distinct fashion when the orders are originated by other traders associated with or otherwise designated by the same trading party. For example, individual traders or other users associated with an investment bank or other institutional investor may be provided with market displays in which orders originating from traders associated with their own trading party are displayed in a first manner, for example in a first color, and trades originating from other trading parties in a second manner, for example, in a second color. Such disclosure techniques are useful, for example, for assisting traders in controlling or limiting intra-office trading.

In such embodiments the invention provides, for example, systems, methods, and computer programming for processing information related to transactions in interests, the interests traded between trading parties over a network, at least one of the trading parties having a plurality of users therewith. The at least one computer displays at least one trading party station terms of proposed transactions in interests, the proposed transactions being executable by the at least one computer according to programming which provides for trading parties to aggress on proposals of other trading parties. The displayed terms comprise terms for transactions proposed by users associated with a plurality of trading parties, terms for the proposals being displayed in various manners in accordance with the identities of the users who proposed the proposed transactions and the identity of users associated with the trading party stations at which the proposals are displayed. For example, the terms of proposals may be displayed in a first manner when the user who proposed the transaction and the user associated with the trading party station at which the proposal is displayed are not associated with a common trading party; and in a second manner when the user who proposed the transaction and the user associated with the trading party station at which the proposal is displayed are associated with a common trading party. In some embodiments, the terms of a proposal are displayed in a third manner when the user who proposed the transaction and the user associated with the trading party station at which the proposal is displayed are the same; and/or in a fourth manner for a set period of time after the terms are changed.

The various manners of displaying information may be differentiated or defined, for example, by varying combinations of parameters used in presenting the displayed terms, the parameters including, for example, various colors, font styles, flashing or intermittent display, and special characters or graphical images.

Additional aspects of the present invention will be apparent in view of the description which follows.

BRIEF DESCRIPTION OF THE FIGURES

The invention is illustrated in the figures of the accompanying drawings, which are meant to be exemplary and not limiting, and in which like references are intended to refer to like or corresponding parts.

FIGS. 2-19 are schematic diagrams of user interface screens for computer trading of interests according to the invention.

DETAILED DESCRIPTION OF PREFERRED EMBODIMENTS

Figure 1:
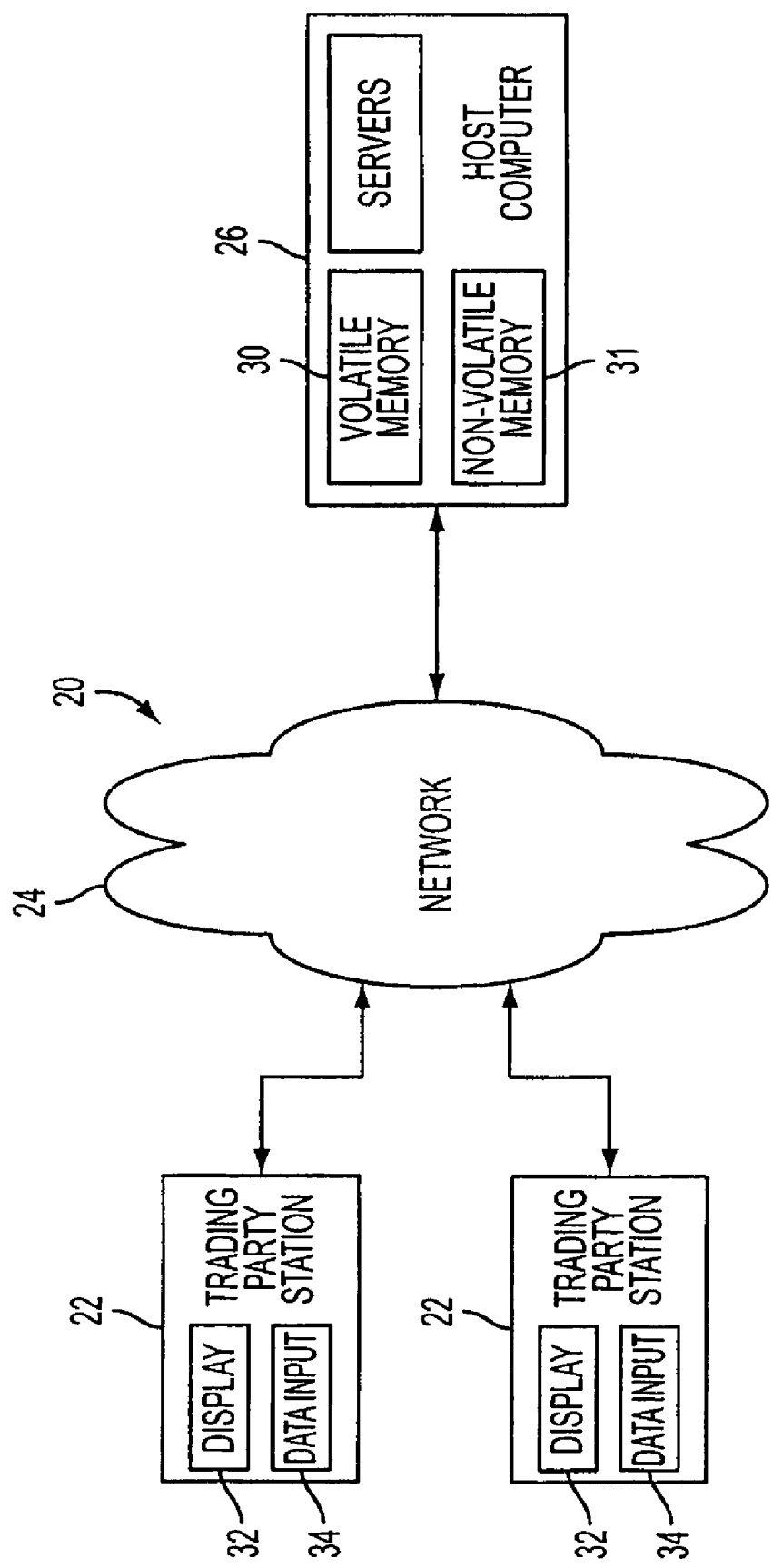
FIG. 1 is a diagram of an exemplary computer network system suitable for use in trading interests according to a preferred embodiment of the invention.

FIG. 1 depicts a system 20 configured as an electronic trading platform for computerized trading of interests. In one embodiment, system 20 is configured for the computerized trading of foreign currencies, in spot, forwards and swap transactions. In other embodiments disclosed herein and/or evident to those skilled in the relevant arts from the disclosure herein, system 20 is configured to trade other interests.

System 20 according to an embodiment of the invention includes a plurality of trading party stations 22 linked to a host computer 26 by a communications and/or computer network 24. Host computer 26 performs various tasks and functions of the system 20, including entitlement, credit, and trading functions. Host computer 26 may be connected in a LAN (not shown) to operate with databases and/or other computers as described, for example, in the incorporated U.S. patent application Ser. No. 09/584,045 mentioned above. Trading party stations 22 may comprise one or more user computers connected, for example, in a LAN as used, for example, by a trading party comprising a brokerage or other trading firm employing multiple traders and administrative users.

The network architecture of the system 20 depicted in FIG. 1, as configured to trade interests in general and FX in particular, is merely exemplary. While this specification describes in an embodiment an architecture comprising a host-computer 26 linked to a plurality of trading party stations 22, other system and network architectures may be employed, and the invention has application to various types of networks and network architectures in which trading party stations may be connected. For example, more than one host computer 26 may be provided, and host computer(s) 26 may be connected in a LAN. Trading party stations 22 may be linked to one or more local or regional computers or servers, the local or regional computers or servers linked to one or more host or central computers 26, or to still other local or regional computers which are linked to one or more host or central computers 26. Also, a trading party station 22 may be linked both to local and/or regional computers and to a host or central computer, or computers, 26. Local and/or regional computers to which trading party stations 22 may be linked may perform some of the functions otherwise performed by a host computer 26 in the embodiment depicted in FIG. 1. For example, a local or regional computer linked to a number of trading party stations 22 may perform functions specific to those trading party stations while a host or central computer performs functions applicable to one or all trading party stations.

Although the plurality of trading party stations 22 are shown in FIG. 1 as having respective direct connections to network 24, there may alternatively be more or fewer connections between trading party stations 22 and network 24. For example, pluralities of trading party stations 22 may be connected to network 24 singly or in groups connected by LANs or WANs, and/or by private Electronic Communication Networks (ECNs) or public networks such as the Internet. Trading party stations 22 may represent a single station of a trading party, or a plurality of trading party stations of the trading party.

Trading party stations 22 and host computer 26 preferably operate in a client/server architecture, with the trading party stations 22 providing respective users with access to host computer 26. Depending upon context, a "trading party" may be in an individual, an individual within a firm, or a firm. A firm may be a bank, a brokerage or trading firm, another institutional investor, etc. The term "user" is meant broadly and encompasses a person who is operating a computer communicatively linked to the system 20, particularly a trading party station on behalf of a trading party, e.g., on behalf of him or herself or on behalf of a firm.

In a preferred embodiment of the invention, a plurality of trading party stations 22 may be connected in a LAN of a firm such as a commercial or investment bank. Within such a firm, a trading party station 22 may be employed for use by a trading party administrator or administrative user, for example, to set credit limits for each of the other trading party stations 22 with which the firm wishes to consider trading. Such a trading party station 22 may be referred to as a trading party administrative station. Trading party stations 22 that may trade with each other may be referred to as counterparty stations.

Trading party stations 22 may comprise any suitable computer or computer system, including, for example, desktops, laptops, personal digital assistants (PDAs), local servers, or other computers or data processors, preferably at least one display 32, such as a computer monitor or other output device, and data input device(s) 34 such as, for example, a keyboard, and a mouse, touch pad or screen, or other selection or pointing device.

Network 24 may comprise a closed network (including, e.g., a router network) and/or an open network such as the Internet. Gateway directors, gateways, firewalls, etc. (not shown) link the host computer 26 to the network 24.

Host computer 26 may include one or more CPUs, and include and/or have access to volatile memory 30 and non-volatile memory 31, which can be shared by various functions of host computer 26. Memories 30 and 31 can store databases and software for processing credit, entitlement, trading, and other functionality, and host computer 26 may manage data storage and retrieval with respect to memories 30 and 31, and other memories which host computer can access, e.g., directly and/or on a network such as a LAN or other network.

In an embodiment of the invention, all processing for the system 20 relevant to the invention disclosed herein is performed by the host computer 26, and trading party stations 22 include programming such as client software that interacts with the host computer to allow users to receive, view, and otherwise process data from, and input and transmit data to, the host computer 26. Each copy of the client software and/or each trading party station may be provided with unique information to uniquely identify each copy of the client software and consequently each trading party station 22. Host computer 26 may be implemented in any suitable single or multiprocessor, commercially available or specially-built computer, e.g., those available through Data General Division of EMC Corp. In one embodiment, where the host computer includes multiple processors, credit, entitlement, and other data is stored in space of volatile memory 30 shared by all processors. Trading, entitlement, credit, and other functionality performed by host computer 26 may be controlled by a single operating system.

In some embodiments non-volatile memory 31 contains one or more records, which may be in the form of one or more databases, for each unique trading party authorized to trade using system 20. Where a trading party comprises a firm having access to a plurality of trading party stations, record(s) are stored in memory 31 preferably for each trading party station and each user of each trading party station in the firm. Each record may contain profile information including unique customer information corresponding to each user of each trading party station associated with the trading party, and to the users' preferences and entitlements; and unique firm information identifying the firm of which the trading party is a part, and firm credit and entitlement information. Preferably a unique customer number is associated with each individual user authorized to use a trading party station 22, and a unique firm number is associated with each firm.

Also stored in non-volatile memory 31, for example in the same or another database or set of databases are records for proposed, accepted, and or executed transactions entered by trading parties. Depending upon the type of trading system supported, transaction records stored in the trade database(s) include, for example, an identifier of the trading party who entered the proposed transaction (e.g., the initiator), including preferably both customer and firm (i.e., user and trading party) numbers; an identifier specifying each interest to be traded; price, quantity, and other terms, such as any relevant dates such as tenor or forward dates. A status and/or trade history is preferably associated with each transaction record. In some embodiments additional information, such as commission rate information and unique transaction identifiers, is included.

Volatile working memory 30 can comprise the memory space where the host computer 26 processes data for trading, entitlement, credit, and other functions. At certain times, such as at startup, the host computer 26 loads the records from the databases in non-volatile memory 31 into volatile working memory 30. Also, the host computer 26 reloads records into or updates records in volatile working memory 30 whenever those records are updated.

Host computer 26 may implement in software, or be linked to a separate computer acting as, an interface server which interprets data and command inputs from trading party stations 22 and controls display of screens on trading party displays 32. Host computer 26 may also implement in software one or more task servers that process credit, entitlement, trading, and other tasks or functions, and store and process data related to the credit and trading tasks.

Functions performed by host computer 26, preferably via server functions in software, include: posting of orders (proposals), monitoring and handling trading activities (e.g., communications relating to aggressing on and otherwise executing proposed transactions), retrieval of detailed order and trade information, requests to download trade and order blotters, and control of information to a backend system that handles the settlement of the executed trades. As pointed out above, the various functions performed by host computer 26 may be performed by other computers in alternate embodiments of system 20.

In presently preferred embodiments, user input/output activity is performed through the use of interactive interface screens displayed on displays 32 of trading party stations 22, using data provided by the host computer 26. Input processing is preferably conducted by "point and click" and/or keyboard keystroke methods using items and graphical input fields. For example, a user can proceed with tasks associated with displayed items by either placing his cursor over the item corresponding to the task and activating an instructional address link by activating the "select" switch, or button, on his mouse or other pointer, to select the item, or he can enter a corresponding number of a menu item at the command line by using keystrokes from the keyboard to select a corresponding command. For example, a user may enter commands by entering a keystroke combination corresponding to an identifier such as a number associated with a listing in a menu. Data may be input by placing the cursor over a desired input field, which may be identified by associated text displayed with the input field, and activating a pointer switch to select the field, and typing data in from the keyboard. Thus input functions are typically accomplished in embodiments such as the one described by positioning a cursor within ("pointing" to) a desired image area and activating a control switch on a mouse ("clicking") to select an item associated with the image area, or analogous functioning of other pointing devices.

Each "clickable" or selectable item on a trading party or user station monitor 32 has an instruction address or other identifier associated with it. Upon selection of an item, an instruction, or event, is sent to an event handler server (which like all servers described herein may be a software process running simultaneously with many other "server" processes on host computer 26). The handler server sends the identifier associated with the selectable item to the appropriate trade server via a message queue/shared memory according for example to an interprocess communication (IPC) scheme. Upon receipt of the message, the trade server checks the user and firm (e.g., trading party) permissions and status and determines what class of item has been selected. Upon determining the item class, the trade server processes the request identified by the click accordingly, updates any database as appropriate, and sends the result back to the event handler, which forwards appropriate screen information to the trading party station 22 associated with the clicked display screen and releases the event handler to process the next incoming screen event.

Figure 2:
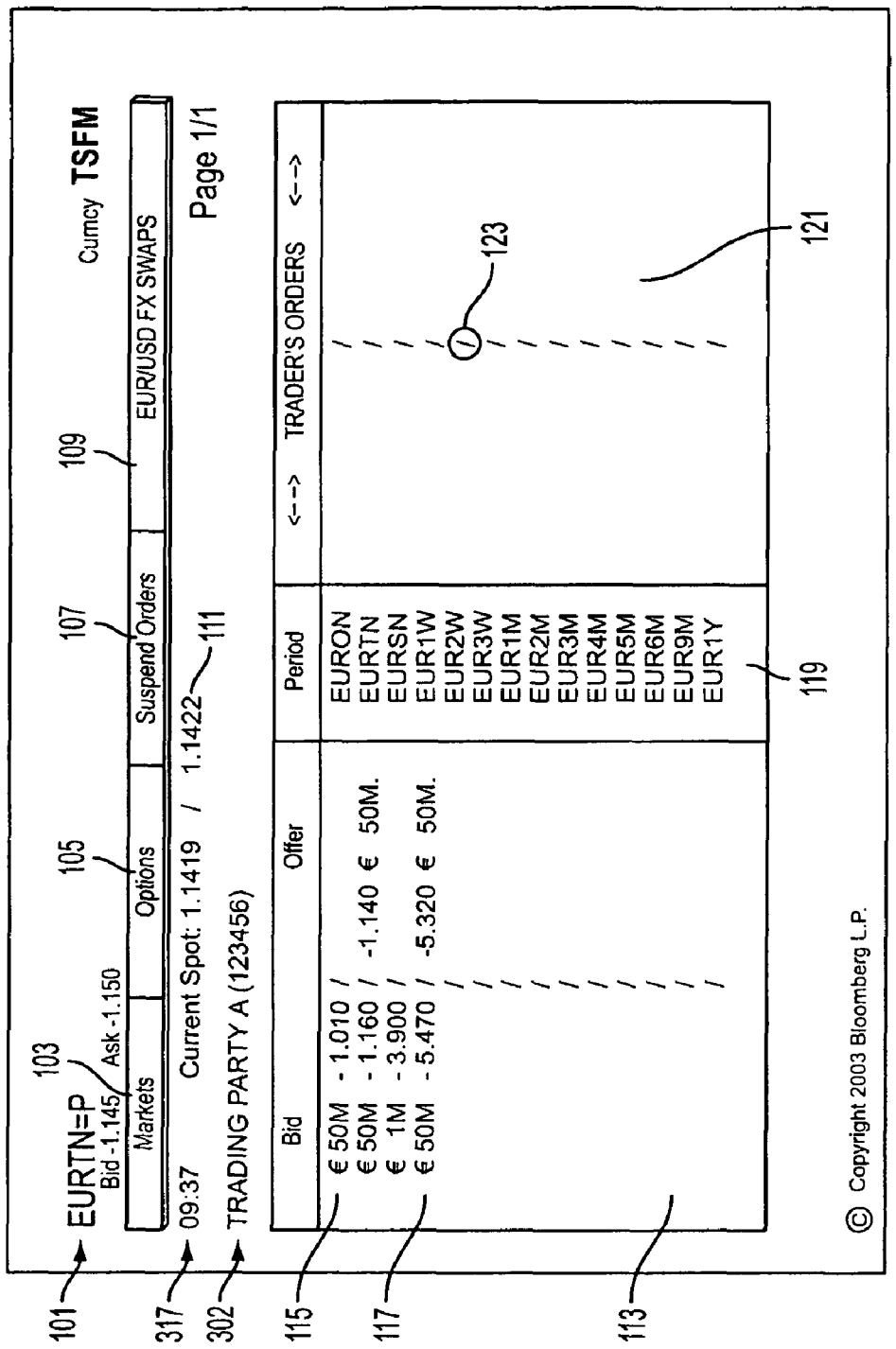

FIG. 2 is a schematic diagram of an interactive user interface screen provided by a host computer 26 for display on a user or trading party station display 32. The screen depicted in FIG. 2 provides a market view of a book of proposals maintained by host computer 26 for trading forward contracts in foreign exchange in transactions proposed by users of trading party stations 22. This screen and the screens depicted in the following figures have been developed as interfaces for the proprietary BLOOMBERG POWERMATCH® FX (hereinafter "POWERMATCH FX") system for trading foreign exchange spot, forwards and swaps, and potentially other interests, implemented by Bloomberg LP of New York, N.Y. The POWERMATCH FX system features described herein are compatible with implementation on a client-server network system such as that shown in FIG. 1, with trading party stations 22 providing appropriate user interfaces and data provided by the POWERMATCH FX host computer 26. Embodiments of systems, methods, and programming for counterparty credit and financial exposure and risk management in electronic trading according to the invention may be implemented in other systems and for many types of interests in addition to foreign exchange, as pointed out above.

A screen such as the one depicted in FIG. 2 is accessed, for example, by entering an appropriate term at the command line of any screen displayed by the BLOOMBERG PROFESSIONAL® trading and information system at an authorized trading party station 22, upon which the POWERMATCH FX system server is invoked and causes the screen to be displayed. The screen depicted in FIG. 2 shows a number of proposed transactions for trades of US dollars and euros, in various tenors, and comprises a number of items, including the terms of the various proposed transactions, adapted for selection and for interactive input of commands related to the entry, acceptance, monitoring, and management of proposed transactions in foreign exchange currency forwards, and for setting of entitlement, credit and other administrative and accounting preferences.

At 101 the screen depicted in FIG. 2 provides an identifier "EURTN" immediately above two output fields "Bid −1.145" and "Ask −1.130". Collectively, these inform the user of the trading party station 22 at which the screen is displayed that the most recent bid and offer transactions executed by the POWERMATCH FX host computer 26 in the "tomorrow next" tenor were executed at prices corresponding to −1.145 and −1.130 basis points from the midpoint of the spot USD-EUR price, expressed in basis points. The spot price is stated in terms of the difference in interest rates set by banks for lending of the corresponding currencies. For example, the interest rates used in designating prices for USD-EUR transactions can be the US prime or LIBOR (London Interbank Offered Rate), or other rates for lending of dollars and euros for the designated periods.

Tenors traded on the POWERMATCH FX system include overnight ("ON"), tomorrow next ("TN"), spot next ("SN"), one week ("1W"), two week ("2W"), three week ("3W"), one month ("1M"), and so on. A trading party wishing to make or monitor foreign exchange transactions can select from any of several currency pairs drawn from US dollars, euros, Canadian dollars, yen, Swiss francs, and several other currencies.

At 103, 105, and 107, a user of a trading party station 22 is offered options of accessing drop-down menus and system commands associated with "Markets," "Options," and "Suspend Orders." Selection of "Markets" item 103 using point and click methods results in presentation of a drop-down menu providing the user with options of selecting from any of several currency pairs for trading. Selection of "Options" item 105 results in presentation of a drop-down menu providing the user with options of selecting from any of several administrative functions, such as setting preferences to be used by the system in presenting trading options to the selecting user. Several of these functions are described herein. Selection of "Suspend Orders" item 109 results in immediate suspension of any and all pending transaction proposals entered by or on behalf of the user.

Current time, as determined by host computer 26 and as used by host computer 26 in processing proposed transactions and in executing trades, is displayed at 317.

At 111 current spot bid and offer prices for the corresponding currency pair are shown. Current spot prices may be derived from any suitable source, including for example most recently completed trades within the system 20 and/or any sources of suitable foreign exchange data external to the trading system. Prices are expressed in terms of interest rate differentials for the selected currency pair, stated in basis points. In the example depicted in FIG. 2, the prices correspond to spot prices for Euros and USD.

At 302 the identity of the trading party associated with the user of the trading party station is identified. As previously discussed, the user may be an in individual trader associated with a trading party station, and/or the firm with whom the individual user is associated.

At 113 in FIG. 2 a book of current bids and offers for the selected currency pair in various forward tenors is displayed. Orders are expressed by placement, by host computer 26, of data in an appropriate column, as indicated, in rows corresponding to the relevant tenor. For example, at 115 a bid for the purchase of 50 million euros on the overnight market is displayed. The stated price is −1.010 basis points from the midpoint of the indicated spot rate. At 117 a bid for the purchase of €50M at a price of −5.470 basis points in a one-week tenor is displayed, with an offer of €50M at −5.320.

In the POWERMATCH FX system trades are entered in the various tenors for forward swaps. Each executed trade entered comprises a near leg, consisting of an immediate spot transaction in the amounts indicated, in the opposite sense, at the current spot price, and a far leg in the sense indicated at the end of the stated forward period (i.e., tenor). In the one-week example just described, the near leg would constitute a sale of €50M at the current spot price, followed at the end of the one week period by a purchase of €50M at 5.470 basis points below the spot EUR-USD spot price current at that time.

At 119 in FIG. 2 a column of active tenors is displayed. Each displayed tenor comprises an active, selectable item, selection of which causes the display 113 to expand to show any existing depth in the market for the selected tenor. Displayed prices in field 113 always include the market best offer, ranked by price regardless of size. If additional orders exist and are displayed, they are ranked by price, again regardless of size. If two or more proposals include identical prices, they are listed first in order of time and then in order of quantity. As will be appreciated by those familiar with the relevant arts, many suitable ranking schemes may be used (for example, price, quantity, time), depending upon user and system operator preferences, and in some cases applicable legal or regulator requirements.

Each proposed trade displayed in field 113 comprises an active selectable item. In the example shown in FIG. 2, selection of any term of one of the proposals displayed in field 113 by a user of a trading party station 22 results in presentation of a pop-up screen displaying all relevant order details, and offering the selecting trading party an option of accepting the proposal and executing the trade. As will be appreciated by those skilled in the relevant arts, other selectable items usable for obtaining further information about a proposed transaction, and/or for initiating acceptance of any of the proposals, may be provided in association with the terms and other information shown in FIG. 2.

In the POWERMATCH FX system all proposals are binding and trading is anonymous. As will be appreciated by those familiar with the relevant arts, many other suitable trading schemes me be used. For example, non-binding requests for proposals and indicators of interest may be used, and the identity of traders may be disclosed to one another. In some cases the binding or non-binding nature of proposals and the disclosure of trading party identities may be regulated or otherwise subject to legal requirements.

Field 121 of FIG. 2 provides for display of all of a user's own pending proposed transactions, and for entry of proposed transactions. In FIG. 2, the user for whom the display is presented has no pending proposed transactions. To enter a proposal, the user places his cursor over a relevant portion of field 121 and selects the desired buy/sell and tenor combination. For example, systems according to the invention provide for the automated simultaneous entry of orders into both sides (e.g., a two-way buy and sell order) of an electronic market. A user wishing to enter both sides of a market for the EUR/USD two-week tenor places his/her cursor over selectable slash mark item 123 and selects it. Selection of item 123 results in the sending of a new order request from the user's trading party station 22 to host computer 26, and sending of appropriate signals for presentation of an interactive interface such as pop-up box 125, as shown in FIG. 3, which is adapted for entry by the trading party user and acceptance by the trading system host computer 26 of terms for both a buy and a sell order for euros and dollars in the two-week tenor.

Figure 3:
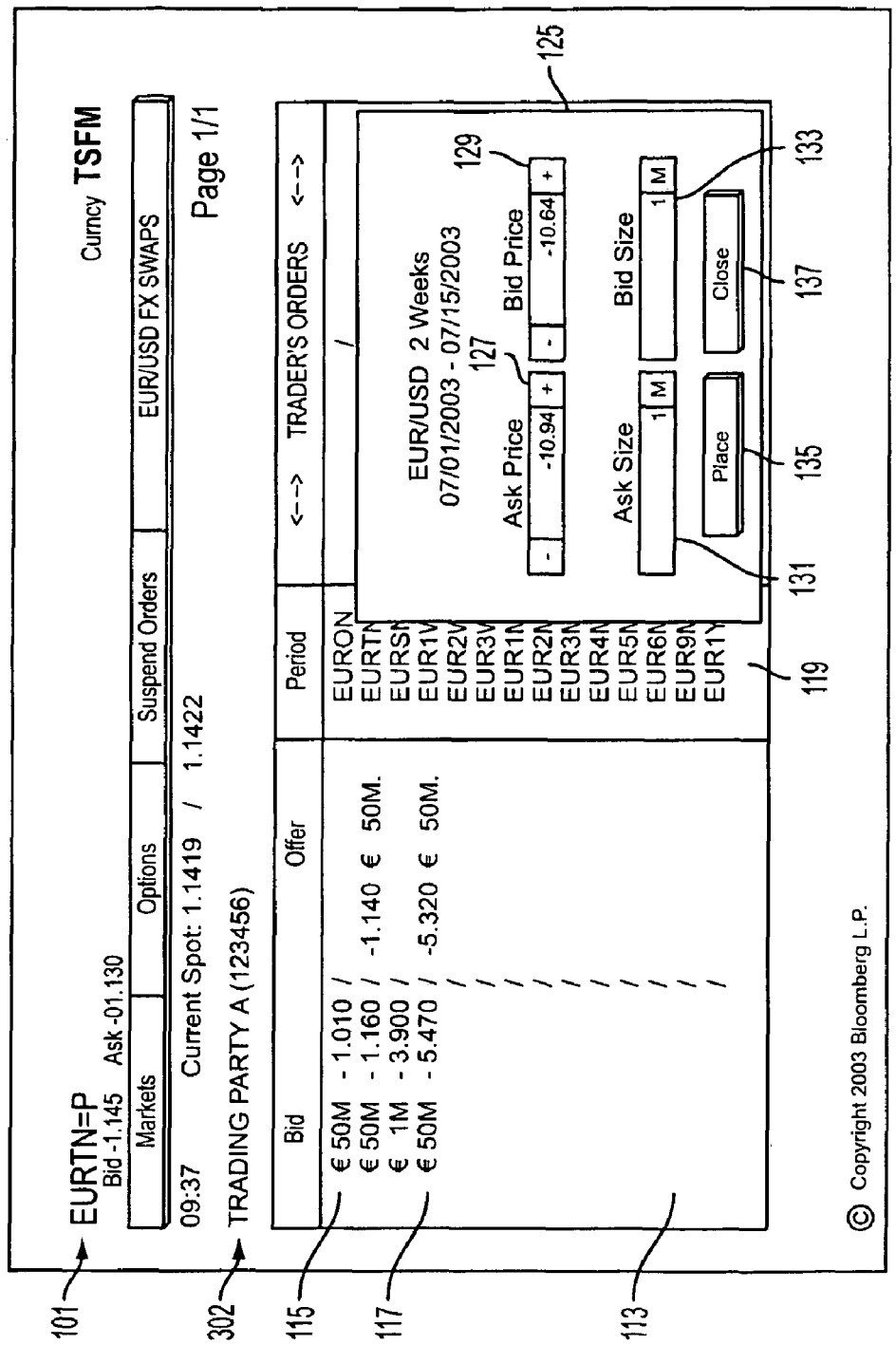

Pop-up box 125 of FIG. 3 provides input fields 127 and 129 for ask and bid prices, respectively, and fields 131, 133 for entry of ask and bid order quantities. For example, a trading party wishing to enter both a bid and an offer for a two-week forward swap, each in the amount of €1M, enters appropriate amounts in fields 131, 133 and prices, stated in terms of basis points relative to the spot price at the end of the forward term, at 127, 129. In the example shown, the trading party has entered data corresponding to a proposed forward sale of €1M at 10.94 basis points below the spot price, and a sale of the same amount at a price 10.64 basis points below spot. Selection of "Close" item 137 would result in cancellation of the proposals before they are entered into the order book. Selection of "Place" item 135 results in entry of both proposals into the order book. In some embodiments, the user or trading party entering the proposed transaction is provided with a pop-up confirmation screen to review and ensure that details of the two-way order are correct, and preferably to modify them if they are not. In the example depicted in FIG. 3, selection of "Place" item 135 results creation and storage by host computer 26 of suitable trade records, as discussed above, and presentation of the proposal in the display shown in FIG. 4, without further confirmation by the trading party entering the order.

Figure 4:
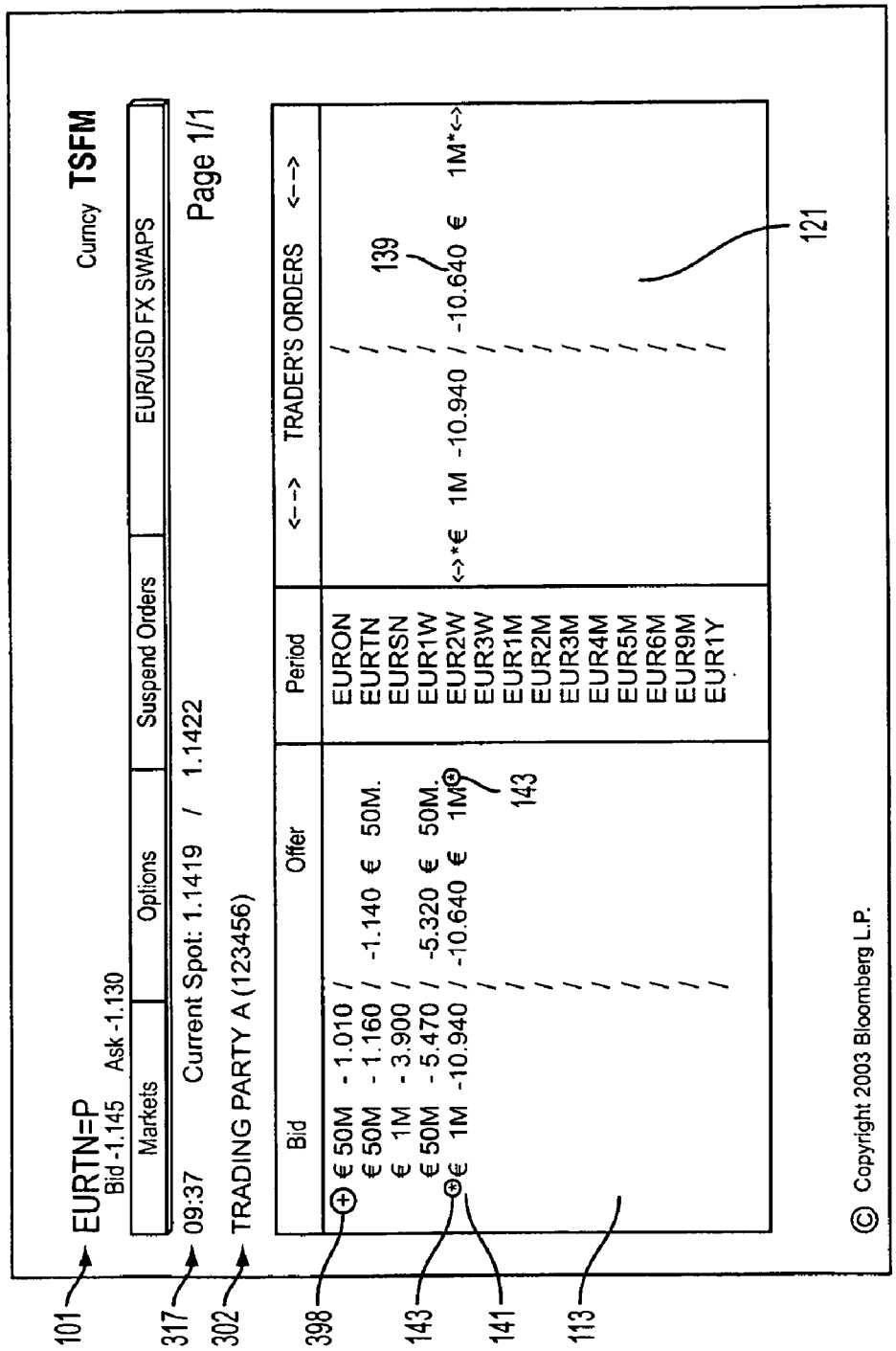

At 139 in field 121 of FIG. 4 the two-way order entered by the trader using the pop-up screen shown in FIG. 3 is displayed in the trader's own book, and at field 141 in the system market book displayed in field 113. Asterisks or other notations 143 in market view 113 notify the viewing trading party that the notated order is his/her own. Other trading parties, and in some embodiments other users associated the entering user's own trading party, may accept one or both of the proposed trades by suitable placement of cursors and selection of the trade data, as described above.

In some embodiments of the invention, the entry of proposed trades for interests is facilitated by the automatic presentation by the trading system to a trading party of default terms for proposed trades on either or both sides of a market. For example, upon entry by a user of a single suitable command, a user of a trading party station provides an interactive interface display comprising overrideable defaults for one or more terms of the proposed trade(s). Default terms can include, for example, an identification of the interest(s); buy and/or sell price(s); quantity(ies) for all or nothing (AON) and/or incremental trades; time period(s) such as forward execution dates, tenors, or loan maturities, associated with the proposal(s); and spread terms for use in static or dynamic calculation of price terms relative to one or more indices. In some embodiments trading parties can designate further controls for generation of default terms, such as for example maximum and/or minimum buy and sell prices; maximum, minimum, and preferred quantity(ies); and indices for calculation of spread prices. In some embodiments one or more of the default terms are overrideable by the trading party to whom they are provided.

In preferred embodiments, default terms provided for trades, as modified if overrideable, become terms of firm trade proposals upon confirmation by the trading party to whom they were provided and entry of a suitable command to make the terms available to other trading parties.

A trading party wishing to set defaults for entering orders according to the invention may access an interactive screen for the setting of default order parameters. For example, by selecting "Options" item 105 in FIG. 2 the trading party, or in some embodiments an administrative user associated with a trading party, is offered options for creating or editing firm or individual user term settings. Selection of the corresponding item results in presentation of a screen such as that shown in FIG. 5. In some embodiments, for example those implemented as features of the POWERMATCH FX system, the trading party is also offered the option of selecting, or is required to select, a particular interest with which to associate the default settings. In the example shown in FIG. 5, the trading party has entered selections to set default trading preferences for user Jane Q. Trader for the EUR-USD spot next tenor for forward swaps trading.

At field 153 in FIG. 5 the trading party is provided with fields for input of default price increments, maximum and minimum prices, price spreads for two-way order entry, and price movement increments for use by host computer 26 in automatically stepping prices for hidden order quantities sold from reserve. The price increment may be used, for example for automatic setting of default prices based on a basis-point spread from the relevant spot price. Maximum and minimum prices may be used, for example, to cap default or user-designated prices in order to prevent accidental mispricing or unauthorized order entry. The two way price spread may be used by host computer 26 to provide default price spreads, stated in basis points, for two-way trades in the corresponding tenor, as for example relative to the spot price.

At field 155 in FIG. 5 the trading party is provided with fields for input of further defaults, including a size increment for automatically generating new orders from hidden quantities sold from reserve, maximum and minimum trade sizes, for use, for example, in controlling an individual user's ability to commit the trading party to financial obligations, and a default order size for one-way or two way order entry. At 157 the trading party is apprised of system limits on the setting of default parameters.

In some embodiments fields 153 and 155 are themselves populated with defaults, provided by the system and preferably overridable by the trading party. In any case, in the example shown, the trading party enters desired parameter values in the indicated fields, within the limits set by the system as shown at 157. Entry of designated values by entry of "1<enter>" (or "1<go>") on a proprietary BLOOMBERG PROFESSIONAL® keyboard) at the command line causes host computer 26 to create or modify suitable records associated with the trading party and/or the individual user, and to store the designated default values to be stored by host computer 26 in memory 31 and used in processing of trade proposals.

An example of provision of default terms for a transaction proposal is shown in FIG. 6. In FIG. 6 a trading party station user has requested an interface for entry of a spot sale of euros for USD by placing his/her cursor in the "offer" field corresponding to the EURSN tenor in field 121, resulting in presentation of pop-up order entry interface screen portion 171. Using defaults entered by the trading party in an interactive interface such as that shown in FIG. 5, a host computer 26 has accessed the appropriate data record(s) in memory 31 and caused trading party station 22 to present screen portion pop-up 171, with the default terms shown: a price of –3.85 basis points, quantity €1M; with straight pricing, to be offered on an all or nothing basis, with no reserve quantities or scaleback price increments, as described in the incorporated reference, application Ser. No. 09/839,529, or price pegging, as described in the incorporated reference, application Ser. No. 10/395,839. The trading party entering the proposed transaction is able to modify any of the terms of the proposal, within limits defined by the user's own designations or limits set by the system, as described.

Upon selection of "Post" item 173, an order record is prepared by host computer 26, included in the host computer's order book, and further processed as discussed herein and in the incorporated references. In some embodiments the trading party entering the proposal is provided an opportunity to review and either confirm or modify the terms of the order, including any terms set by default, by presentation of a suitable user interface screen, as previously mentioned.

Figure 7:
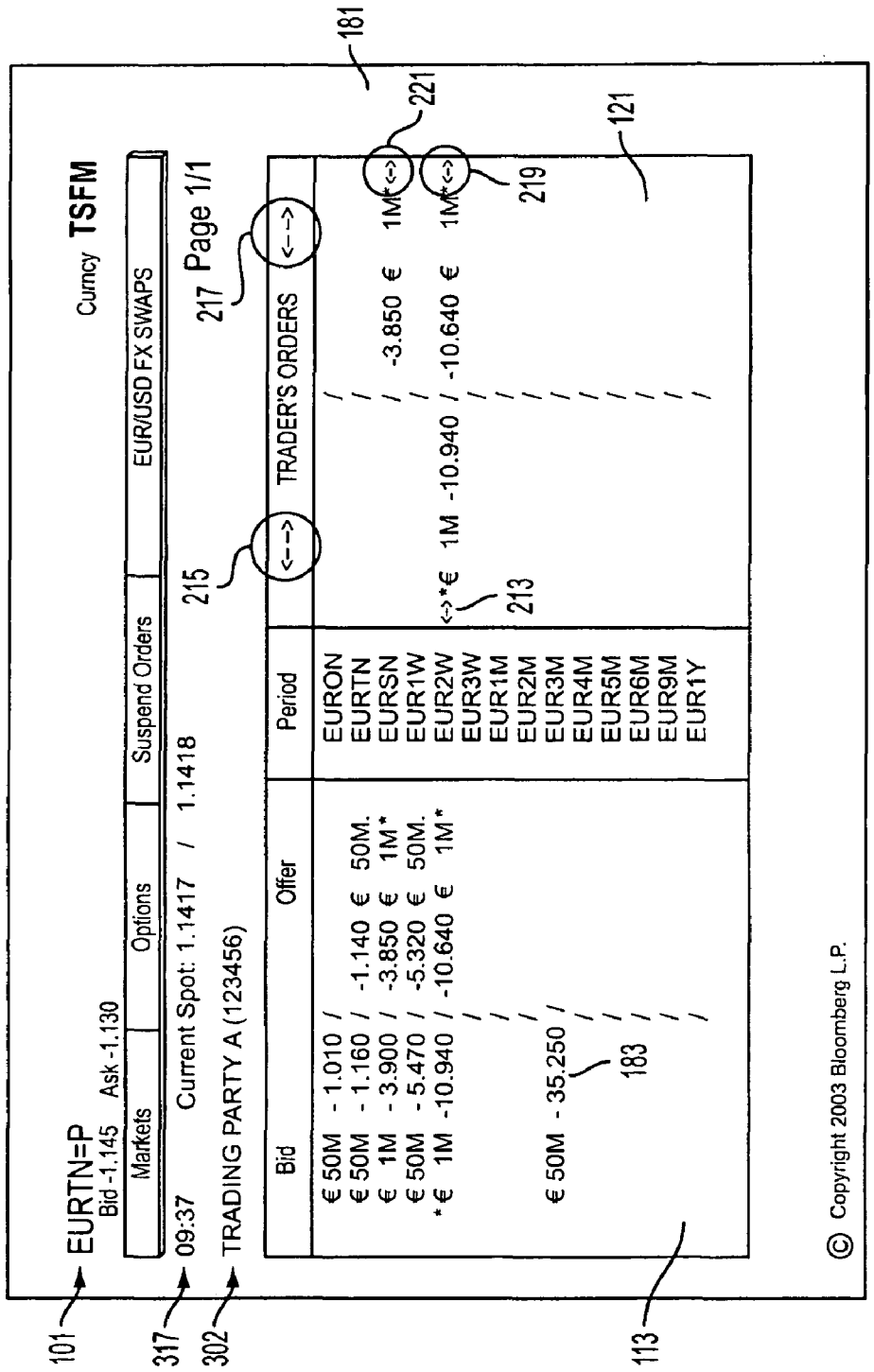

The order is then displayed in market or book view field and the trading party's own order view field 121, as herein described, and as indicated at 181 in FIG. 7.

Using default terms, as herein described, it is possible, according to the invention, for a user to create and post a proposed transaction with the entry of two, or even one, computer command.

The invention provides for the presentation of terms of proposed transactions to trading parties in terms selected or otherwise designated by the trading parties. For example, a price term for a proposed trade associated with a future date may be expressed in terms of present, future, or other designated value(s). For example, in a system for trading of foreign currency forwards, a trading party considering a proposed forward transaction may elect to have terms of the transaction displayed in straight, or current, amounts; in split, or forward amounts; or both, prior to determining whether to accept the proposal or execute the trade, and/or after the trade has been accepted and/or executed.

For example, a trading party wishing to consider, or to aggress on, a proposed transaction in the POWERMATCH FX system may "click" on the desired proposal to review terms of the proposal and to accept it. For example, a trading party wishing to accept (i.e., hit) the three-month swap bid for €50M at –35.250 shown at 183 in FIG. 7 may select any of the displayed items of the proposal, causing the terms and other details of the proposed transaction to be displayed in a pop-up acceptance confirmation screen 185 as shown in FIG. 8a.

Figure 8A:
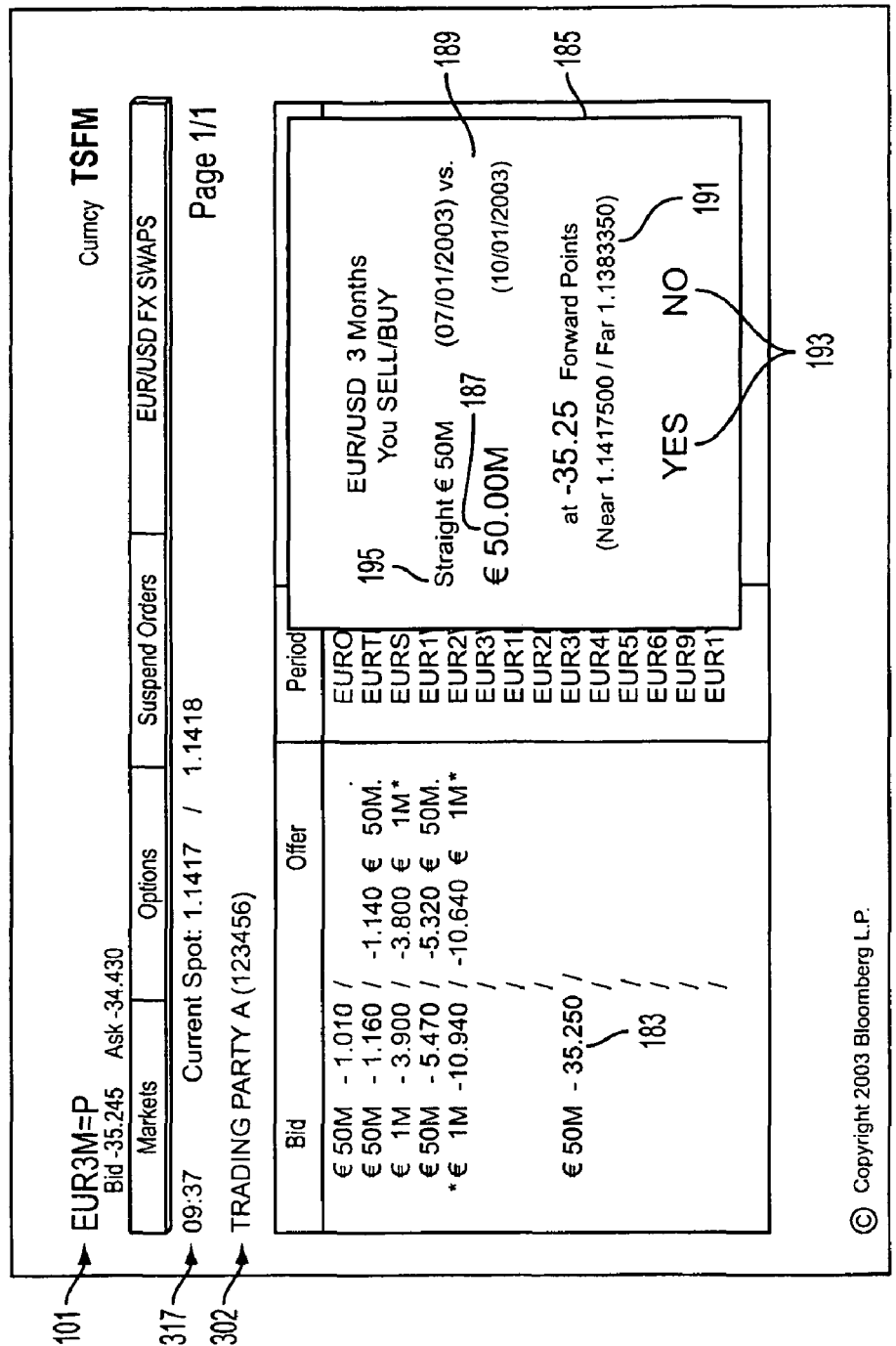

Confirmation screen 185 of FIG. 8a confirms all details of bid 183. In FIG. 8a, the price indicator item at 195 is shown as "straight." This means that the €50base amount of the trade shown at 187 is the €50M notional amount. Also shown are: the start, (or near), and end, (or far) (i.e., execution or maturity dates, respectively) of the swap contract, Jul. 01, 2003 and Oct. 01, 2003, respectively, at 189; and the near and far interest rates at 191. "YES" and "NO" trade acceptance and trade rejection indicator items are provided for acceptance or rejection of the transaction by the viewing trading party.

As previously mentioned, a forward swap agreement may be viewed as a contract for two separate foreign exchange transactions: an immediate spot transaction and a reverse spot transaction at the closing date of the forward term, or the maturity date of the contract (in the case depicted in FIG. 8a, on 1 July and 1 Oct. 2003, respectively). Thus for the proposed transaction shown in FIG. 8a, the trading party to whom the display shown in the figure is presented is considering an immediate spot purchase of 50M, at an interest rate differential of 1.14175 percent, and a purchase of 50M at an interest rate differential of 1.138335 percent at the 1 Oct. 2003 end date of the transaction. A user wishing to view the total projected value of the far leg of the swap in the split amount, or the present value of the notional amount, in view of the expected rate of interest over the life of the swap contract, may select "Straight" item 195.

Figure 8B:
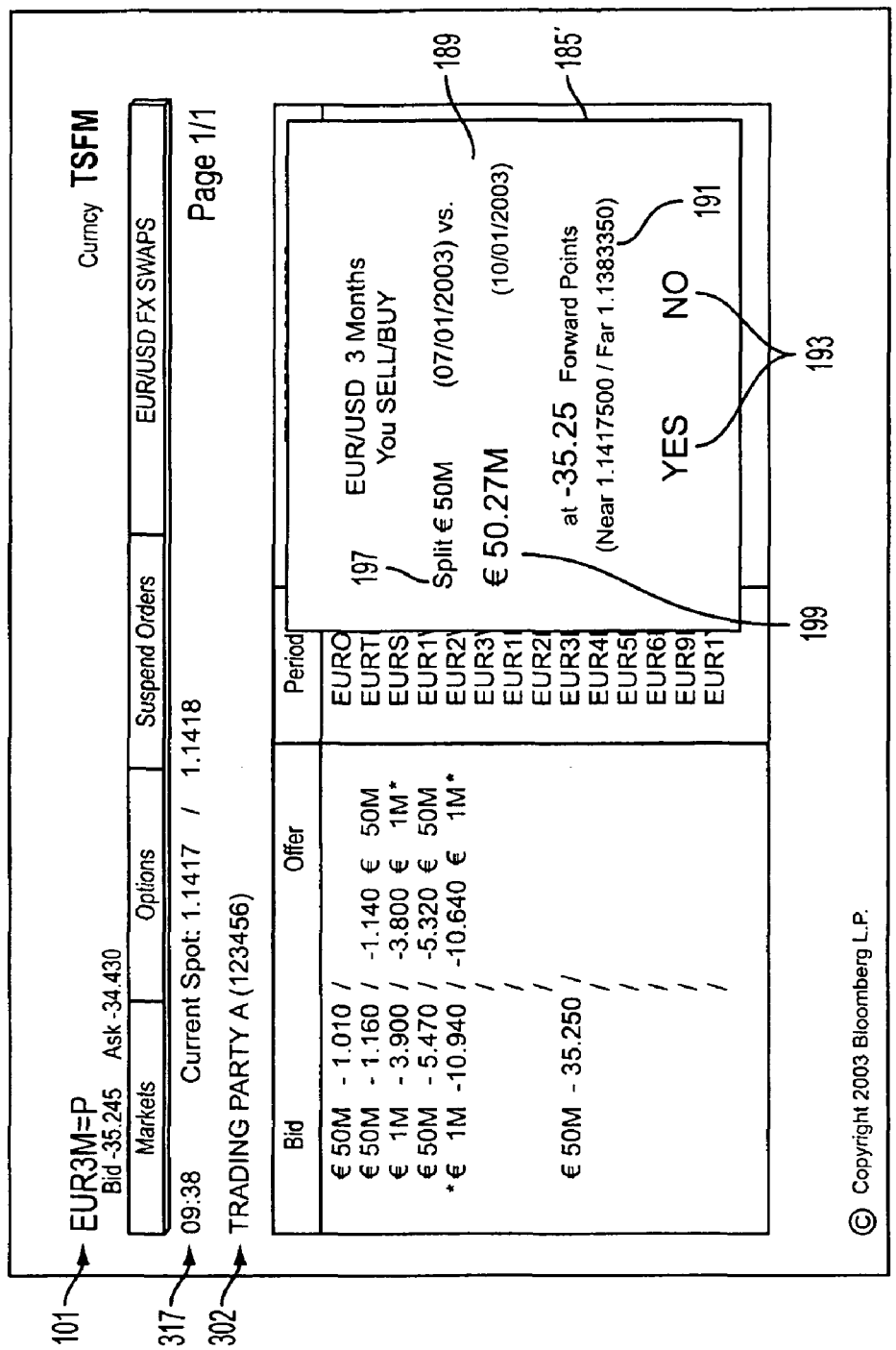

Selection of the price indicator "Straight" item 195 from the screen depicted in FIG. 8a results in determination of the split amount and presentation of the changed screen shown in FIG. 8b, where "Split" is shown as the price indicator item at 197. The split amount of €50.27M is shown at 199.

The split amount of a forward transaction may be determined using the formula:

Split Price=$P*(1+R)^{(n/b)}$, where:

P=Principal
R=Interest Rate
N=Number of Days in contract term
B=Basis (360/365)

While the split amount 199 is shown on the display screen, the viewing trading party may cause the straight amount to be displayed by selecting the price indicator "Split" item 197. In the case illustrated in FIG. 8b, selection of item 197 would result in presentation of the changed screen (with respect to the screen of FIG. 8b) shown in FIG. 8a.

While the split amount 199 is shown on the display screen, the viewing Trading party may cause the straight amount to be displayed by selecting split item 197. In the case illustrated in FIG. 8b, selection of item 197 would result in presentation of the screen shown in FIG. 8a.

Figure 9B:
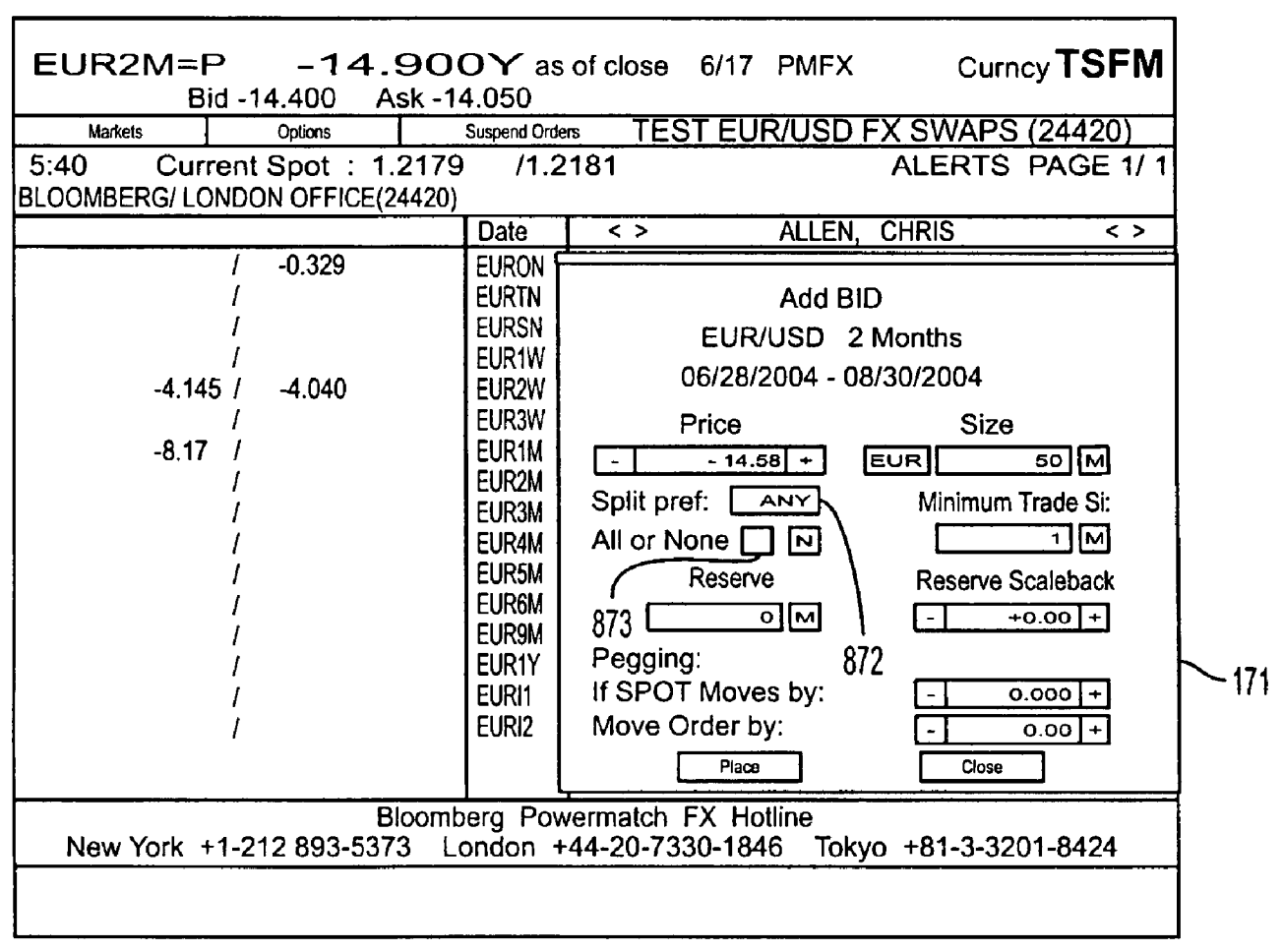

In some embodiments a user is provided with functionality allowing the user to exercise even greater control over preferences and/or requirements in futures trading. For example, by accessing a User Term Setting screen such as that shown in FIG. 9a, a user is provided with the option of setting defaults for forward swaps proposals to be entered proposed by the user. Pop-up field 871 of FIG. 9a provides a user with the option of specifying that terms for forward swaps be proposed by the user, and subsequently processed by the trading system, in straight amounts or in split amounts as a default, by entering a "1" or a "2" in the corresponding field, or that the user has no preference, by entering a "O". By entering a "1" or a "2" in the appropriate fields of field 871 a user specifies that terms shown, for example, in pop-up box 171 of FIG. 6 are to be entered in either straight or split amounts, in accordance with the user's choice.

The preferences set in field 871 may be set for all interests traded, or for each combination of interests traded by the system, or any combinations or subsets thereof. For example, in the foreign exchange system described in the figures, a separate set of preferences may be set for each combination of currency pairs and forward tenors. In the example shown in FIG. 9a, preferences are set for forward swaps in US and Canadian dollars in the 3-month tenor.

In such embodiments, the designations added at field 871 may be defaults only, overridable at the request of the user entering the proposal. For example, a user who has entered default preferences using field 871 my be presented, upon entering terms for a proposed transaction, with a screen including a pop-up order entry field such as field 171 of FIG. 9b. The user's preference ("ANY", corresponding to "NONE" in field 871) for display of price terms in split or straight amounts is echoed at field 872. A pop-up menu of choices available to the user is presented at 873. By selecting a suitable menu item or entering an appropriate value in field 872, the user may change the user's preferences for the proposal shown in field 171 without affecting the user's default preferences.

Optionally the selection made at field 872 is not overridable by any aggressor who may wish to act on the user's proposal, and the choices made by the proposing user may be used for any subsequent processing of any executed trade, in addition to being used in preparing displayed term proposals.

In some embodiments a user is provided with the option of designating other aspects of transaction proposals. For example, in the foreign exchange system described in the Figures, a user is provided in FIG. 9c with functionality allowing the user to designate, at field 874, an interest rate index to be used, for example, in computing split amounts for display with proposed transactions, and in some embodiments other subsequent processing. In the example shown in FIG. 9c, a user is presented with options for preferences in trading US and Canadian dollar swaps in a six-month forward term. At field 874, the user has designated that the default Canadian dollar six-month interest rate, which might for example be designated as the currently-published LIBOR rate, is to be used in computing split amounts in that tenor for the US dollar-Canadian dollar currency pair. At 875, the user is provided an option of entering identifiers to be used in reporting trades in the selected tenor, as for example in public or private market reports.

As another example, a trading party may elect to have terms for proposed trades of interests presented in various forms, including for example in terms of either or any of the interests involved. For example, in a system for trading foreign exchange interests such as POWERMATCH FX, a trading party may designate that it wishes to have terms for proposed transactions stated and/or displayed in terms of any of the involved currencies, such as United States dollars (USD), euros (EUR), Canadian dollars (CAD), or other currencies.

In the POWERMATCH FX system, a trading party may elect to view trades in terms of a desired currency by entering an appropriate term at the command line or by selecting "Options" item 105 in a screen such as that shown in FIG. 2, selecting the "Switch Currency" item from the resulting pull-down menu, and entering the desired currency pair in the resulting menu, as shown in FIG. 10a. For example, in the screen depicted in FIG. 10a, "clicking" item "4) EUR/USD" or entering the command "4<enter>", or "4<go>" at a Bloomberg proprietary keyboard, would cause host computer 26 to enter or modify records of preferences for the trading party making the selection, and cause all market view, blotter, and other screens presented at the party's trading party station 22 to show euro-dollar trades expressed in euros instead of USD, as shown in FIGS. 2-9. Making the same selection again would cause the system to display euro-dollar trade terms in USD instead of euros. At 210 a warning is displayed to the trading party indicating that all of the trading party's orders and market monitors are suspended during the running of administrative processes.

Figure 10B:
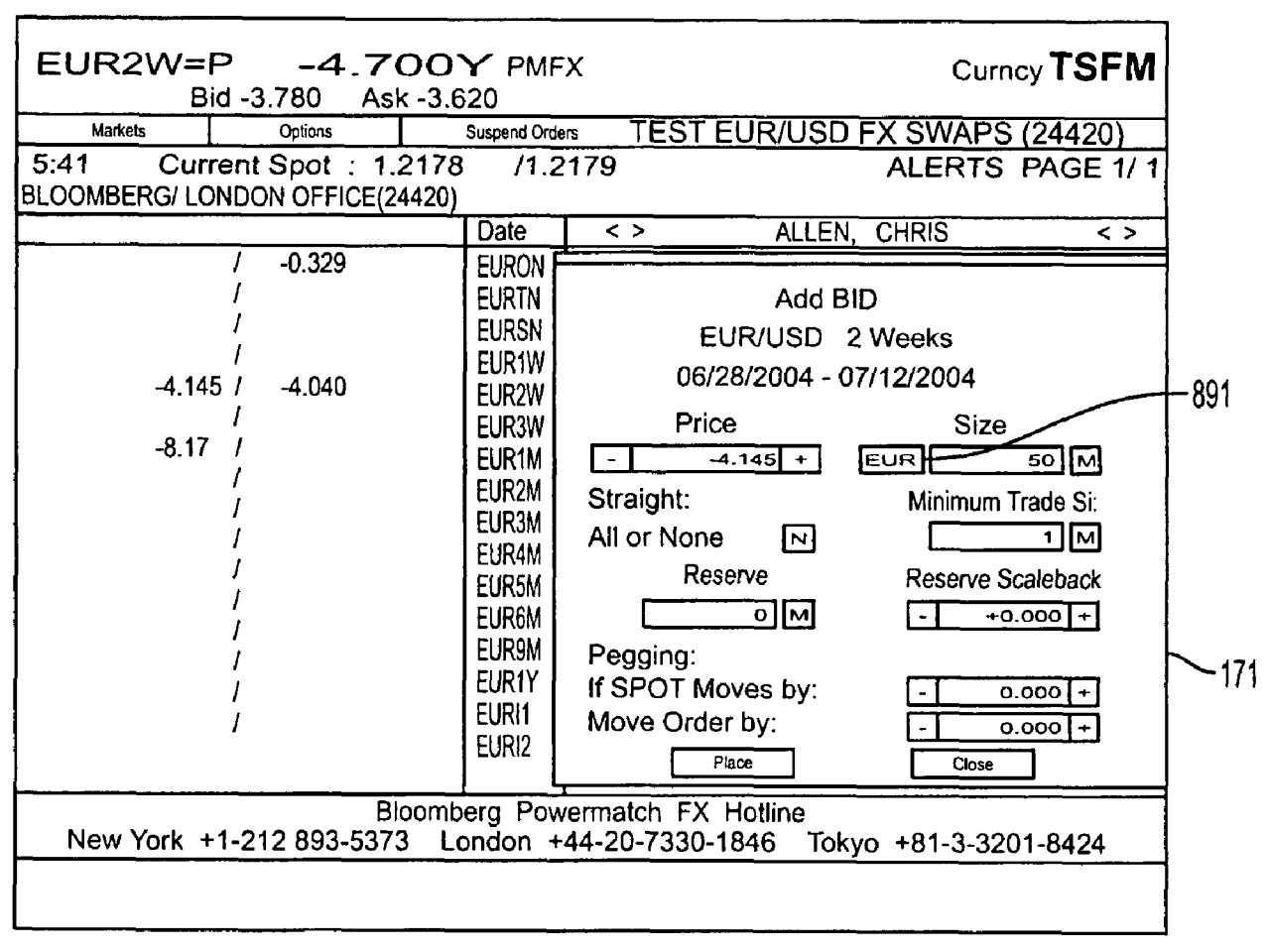

Optionally a selection made using an interface such as that shown in FIG. 10a is a selection of an overridable default, so that preferences for specific transactions, or for transactions in specified interests, or groups thereof, may be set on an individual basis. For example, terms for a proposed transaction in euros and US dollars are shown in field 171 of FIG. 10b. The proposed transaction is a euro-dollar swap in the 2 week forward tenor, for a notional amount stated as 50M euros. By entering a suitable identifier (e.g., "USD") in field 891, the user may specify that the proposal be stated, and subsequently processed, with all price terms stated in US dollars.

The invention further provides improved means for changing terms of proposed transactions, and especially groups of proposed transactions, as for example for entry to a market or to keep proposed transactions up to date in a changing market. For example, the invention provides for incrementing terms of each of a user's or trading party's proposed transactions on one or both sides of a market, such as price or quantity terms for buy and/or sell proposals, by amounts previously designated by the user or trading party who proposed them. For example, the system can display a special interactive functional element, such as a selectable item, for use by a user of a trading party station. Selection of the item using an input device such as a mouse or other pointer causes a command to be issued to the trading system computer, the command causing the system to change all of the price, quantity, or other terms associated with pluralities of the trading party's proposed transactions. For example, selection of an arrow item "→" displayed on an interactive interface screen can cause price or quantity terms of all of a trading party's displayed proposed trades on one or both sides of a market to be changed incrementally upward or downward, by an amount previously designated by the trading party or the system.

For example, in the screen shown in FIG. 7, a user of a trading party station 22 may increment the price terms of his own orders by using arrow items 213, 219, 221, 215, 217. Selection of one of arrow items 213, 219, 221 increments price terms for the corresponding individual orders as described in incorporated application Ser. No. 09/584,045. Selection of one of arrow items 215, 217 causes host computer 26 to access and modify data records of corresponding transaction proposals as appropriate to increment or decrement price terms for each of the trading party's proposed trades on the entire corresponding side of the market, and to process subsequent hit or lift orders (proposal acceptances) accordingly. For example, selection of the arrow pointing to the left in item 217 causes the price terms associated with both of the orders at 219, 221 to be incremented upward by the amount specified by the user in the "Price Increment" field at 153 in FIG. 5; while selection of the arrow pointing to the right causes the same prices to be incremented downward (i.e., decremented) by the same amount. In some embodiments of the invention, selectable items corresponding to arrows 215, 217, are provided; selection of such items causes the computer system to increment quantity terms (e.g., the notional amount associated with a forward swap contract) instead of or in addition to the price terms as shown.

The invention also provides tools for the protection of trading parties' orders, and/or for preventing the manipulation of the trading party and/or the relevant market. The invention provides, for example, for restricting the availability of a trading party's orders to repeated acceptance (e.g., repeated hitting or lifting of the trading party's bids and/or offers) by other parties, particularly where the trading party has more than one proposed transaction pending in a market. For example, where a trading party enters or has pending multiple orders in the same or different interests, such as different tenors of foreign exchange forwards, or where the trading party enters or has pending orders comprising reserve quantities in a single interest, the trading party may designate one or more counterparties and in some embodiments set a time period during which the counterparty(s) are to be restricted from accepting any further trades proposed by the trading party, after accepting a previous trade, or may for example elect to prevent any trading parties from accepting multiple proposals within a given period of time. This feature is useful, for example, in preventing "sniping" techniques used by some traders in repeatedly hitting or lifting offers of other traders, and in protecting traders who inadvertently leave orders pending in a rapidly changing market.

For example, a trader wishing to prevent repeated rapid acceptance of its orders by other trading parties may access a screen such as that shown in FIG. 11, for example by entering an appropriate term at the command line in order to update the trading party's preferences. By entering an appropriate flag, e.g., "A" for aggressor, "W" for world, or "N" for none, at field 227, the trading party may designate ("A") that the most recent aggressor, or any specifically designated trading party, will be prevented from executing another of the trading party's orders for a designated period of time, or ("W") that no other trading party will be able to execute one of the trading party's orders within the designated time period since the last acceptance of one of the trading party's orders. In the former case, whatever party last executed one of the trading party's orders will be prevented from trading with the trading party again during the designated time period. In the latter case, the trading system will not permit trading with any other party at a frequency greater than that of the designated time period. This "anti-sniping" feature may be disabled by the user, by leaving field 227 blank. In the currently contemplated embodiment of the POWERMATCH FX system, the system will designate a time period of 15 seconds, which may not be modified by trading parties. It has been determined on the basis of experience that 15 seconds is long enough, for example, to prevent manipulation of portions of the market, or the taking of unfair advantage of individual trading parties, in many cases. In other embodiments, a trading party may set a time period during which trading will be restricted, or the frequency with which its orders may be accepted; may identify trading parties to whom such restrictions will apply; and/or specify individual interests, or groups of interests, to which such restrictions will apply.

In embodiments of the invention implementing such antisniping features, each command entered by a trading party to aggress on another party's transaction proposal is checked by the computer system. If the acceptance command has been preceded by another such command entered by a designated party (which may be any party) within the set period of time, the system will not execute the command by allowing the trader to accept the proposed transaction. The would-be aggressor may be notified of the refusal by the system to accept or act on the command, or the command may be simply ignored, so that no notification is given the proposed transaction is not affected.

Anti-sniping features may be applied to specific interests (e.g., 3-week forward tenors for USD-Canadian dollar swaps), for groups of interests (all USD-Canadian dollar swaps), or for all interests traded by a user, a trading party, or a group of trading parties.

In other embodiments the invention provides, for example, the automatic withdrawal or suspension of a trading party's pending proposals at a given time during a day or trading session, such as for example at the end of the trading party's trading day. For example, a trading party may designate a time of day at which the trading party's pending orders are automatically suspended or withdrawn from the trading system and the trading party is, for example, logged off. The trading party may be offered the option of reinstating or re-entering the proposals, with or without further confirmation by the trading party, at the beginning of a subsequent trading session, or at another time designated by the trading party. End of day and other automatic suspension functions may be set on a firm or individual trader basis.

Figure 12:

In the POWERMATCH FX system, an end of day suspension feature may be set by a firm administrator on a user-by-user basis, through use of an interface screen such as that depicted in FIG. 12. A firm administrator accesses a screen such as that depicted in FIG. 12 by entering a command such as "TSFP" at the POWERMATCH FX command line and entering an individual user-identification code. For example, the screen of FIG. 12 depicts a screen associated with firm #269318 and individual user or trader #883624. The administrator may enter the user's name, contact information, and other data, including trading and cancellation permissions by entering appropriate data. At 233 the administrative user may enter a time at which all of the individual user's trading functionality, including pending orders, will automatically be suspended. Upon entry of the data, host computer 26 makes or modifies a suitable data record, so that at the stated time on each succeeding trading day the trader's functions will be suspended. Functions will resume at the beginning of the next trading day. In some embodiments terms for any suspended orders are saved in memory 31 so that the trades may be reinstated by the trading party after the beginning of a new trading session.

When an end of trading day feature is enabled for a trading party, at the end of the trading day the trading party's functionality is suspended and the trading party may be sent a notification such as that shown in FIG. 13, indicating that the trading party's orders are being suspended.

The invention also provides for trading by one user or trading party on behalf of, or in the name of, a second user or trading party. For example, a first user, which can be for example an administrative or trading user of a trading party station according to the invention, may enter communications related to proposed transactions attributable to or otherwise associated with a second user of the same, or another, trading party. Such communications may include terms for new or changed transaction proposals, transaction commands such as attempts to hit or lift proposed transactions, or any other communications associated with proposed transactions. For example, a user may submit communications on behalf of another user by providing an identification number corresponding to the second user to the trading system, so that, at least a first level of trade reporting, the second user is solely identified as the user entering the transaction command or other communication. In second or deeper levels of reporting, the first user may also be identified, for example, to assist in auditing and accounting.

Figure 14:

In the POWERMATCH FX system an individual user associated with a trading party, e.g., an individual trader or an administrative who has sufficient authority, may enter another individual users unique identification number, and a password associated with the unique user identifier, to enter proposed transactions. Thereafter any trades entered by the first user will be associated with both the first and second user's identities. At an initial level of reporting, as for example that shown in a trading party order monitor such as that shown in FIG. 14, a second user's identity (e.g., "Trader A") is the only one disclosed in connection with the proposed transaction. By accessing more detailed information relating to a particular order, however, as for example by selection of one of the orders shown in the trading party order monitor of FIG. 14, so that a screen such as that shown in FIG. 15 is presented, showing at 255 that the order was placed by a first user (e.g. "Trader B") on behalf of the second user. Varying levels of reporting details of may include, for example, levels of confidentiality in reporting, the varying levels of confidentiality associated with authorizations to access reports displayed on user interface screens, in print, etc.

The invention further provides features for improved monitoring of markets. For example, in trading systems in which books of orders or other pluralities of transaction proposals are displayed to a trading party, an order comprising a changed term may be displayed in a highlighted manner, such as in a distinct color or flashing text, for a period of time after which the term has been changed. For example, in a system in which books of proposed transactions are displayed in a first, or constant, color, such as white or amber, a new order or an order in which a price or quantity term is changed may be displayed in a second color, such as red, and/or in an intermittent, or flashing display, for a set or designated period of time, such as 1-30 seconds, following the entry of the order or the changing of the term. After the set highlighting period, the order terms may be displayed in the manner of other pending orders. The period of time in which new or changed orders are shown in highlighted form, and the manner of highlighting, such as the choice of colors or style of flashing or other highlighting, may be set by the viewing trading party, by an individual user associated with a trading party, by the trading system, or by any combination thereof. It has been found by experience that periods of between 1 and 30 seconds are sufficient for most trading systems and user requirements in the current trading environment. Where flashing or intermittent displays are used, frequencies of for example 0.5-2 hertz may be used advantageously.

Figure 16:

As an example, a color map for the POWERMATCH FX system is shown in FIG. 16. Map 271 is accessed by, for example, selecting an item "color map" on the "options" pull-down menu accessed via item 105 of FIG. 2, as previously discussed. In the color map it is seen that pending orders of more than the designated period's standing are shown in amber. Orders that have changed within the designated time period (e.g, 1-30 seconds) are shown in white. Orders specifying all or none terms are shown in steady blue. Orders comprising reserve quantities are shown in red; and orders comprising reserve quantities with scale-back price features as disclosed in the incorporated reference as shown in amber on blue. An order which is pegged to an index is shown in yellow. In some embodiments a trading party may elect to see orders of the type described in such highlighted fashion only when they are the trading party's own orders. In other embodiments all trades are displayed to all trading parties in accordance with some or all of the highlighting rules.

The invention also provides improved risk management features. For example, in a trading system in which credit may be established between a trading party and potential counterparties for trading of interests, a trading party may designate one or more other trading parties with whom the trading party wishes to share or pool credit. For example, a trading party corresponding to one office or branch of an investment bank or other institutional investor may designate another office of the same entity for sharing of credit. Shared credit limits may be used, for example, by the trading system, for prescreening orders displayed for or otherwise made available to the credit-sharing parties in market displays, and/or in enforcing limits on credit between the credit-sharing parties and designated counterparties upon attempted execution of proposed transactions. Shared credit limits may used in conjunction with multiple counterparty credit limits associated with various time periods.

In the POWERMATCH FX system a trading party designates other trading parties it wishes to share credit with by accessing a screen, as described above and shown in FIG. 17, and entering "4<enter>", or "4<go>" on a Bloomberg proprietary keyboard at the command line, as indicated at line 293. This results in presentation of a screen such as that shown in FIG. 18. The interface screen of FIG. 18 provides input fields 295 for entry of trading party identifiers of trading parties to be included in the shared credit group. Upon mutual entry of identifiers in shared credit groups, host computer 26 updates suitable credit records, and during subsequent trade processing the trading parties so identified are enabled to share common credit benefits, including the ability to add to or draw against, or replenish credit limits. For purposes of host computer 26 in processing credit data, all members of the group are considered part of the same credit entity. Thus a group credit limit will be affected by trading by any member of the credit group, i.e., credit will be drawn down from a single combined credit account. All users of all group member trading parties having suitable administrative permissions will have the ability to change credit extended by the group to other trading parties. In preferred embodiments, members of shared credit groups will still be enabled to trade with each other.

Shared credit limits may also be used, for example, in providing credit-filtered market views of bids and offers for the selected currency pair that user of the trading party station is enabled to make, e.g., the screen depicted in FIG. 4. For example, credit information may be used by host computer 26 to provide a limited credit-filtered view, a color-coded credit-filtered view, or a view unfiltered by credit. Where the market view is not credit filtered, or color coded to show trades with and without sufficient credit but with insufficient credit orders selectable, credit information may be used in a credit checking procedure during an attempted trade, e.g., a trading party or user station 22 may hit or lift a visible bid or offer, and thereafter, host computer 26 determines if there is sufficient credit for the proposed trade.

Credit limits may also be used to block trades for which insufficient available credit exists. For example, upon attempted acceptance of a proposed trade, credit is checked for one or both parties, and if insufficient credit is available the trade is disallowed. If partial trading is enabled, a partial trade for an amount up to the credit limit may be allowed. In such an embodiment, for example, execution or acceptance of a proposed trade is inhibited, or the price, size, or quantity of the proposed trade is capped, if a price term associated with the proposed trade is greater than an available portion corresponding to a credit limit associated with the trader, the potential counterparty, and a time period associated with the proposed trade.

In trading systems comprising multiple, multi-time period credit limits between counterparties, shared credit accounts can be treated as aggregate credit limits, to be applied to all time periods.

In some embodiments of the invention, orders displayed in market or other views may be displayed or otherwise disclosed in distinct fashion when the orders are originated by various classes of users and/or trading parties. For example, individual traders associated with an investment bank or other institutional investor may be provided with market displays in which orders originating from traders associated with their own trading party are displayed in a first manner, for example in a first color, and trades originating from other trading parties in a second manner, for example, in a second color. Such disclosure techniques are useful, for example, for assisting traders in controlling or limiting intra-office trading.

In the POWERMATCH FX system a user or trading party may designate other users or trading parties to whom it wishes to disclose its orders by accessing a TSFP screen, as described above and shown in FIG. 17, and entering a command string "3<enter>" (or "3<go>" at a Bloomberg proprietary keyboard) at the command line, as indicated at line 293. This results in presentation of a screen such as that shown in FIG. 19. The interface screen of FIG. 19 provides input fields 297 for entry of identifiers corresponding to users and/or trading parties to be included in an order disclosure group. Upon entry of identifiers in disclosure groups, host computer 26 updates suitable trading party profiles records, and during subsequent display processing information related to transactions entered by members of the disclosure group is identified to each other by, for example, display of an identifying item such as a designated character, such as for example cross 398 in market book view field 113 of the screen depicted in FIG. 4. In this manner trading party members of the disclosure group are made aware that orders in the market view have been entered by other members of the disclosure group.

In such embodiments terms of proposed transactions may be displayed in a first manner when the user who proposed the transaction and the user associated with the trading party station at which the proposal are displayed are not associated with a common trading party; in a second manner when the user who proposed the transaction and the user associated with the trading party station at which the proposal are displayed are associated with a common trading party; in a third manner when the user who proposed the transaction and the user associated with the trading party station at which the proposal are displayed are the same; and/or in a fourth manner for asset period of tine after the terms are changed. The various manners may be defined using various combinations of parameters in presenting the displayed terms, the parameters including, for example, color, font style, intermittent display (e.g., flashing or blinking text), and identifying items such as crosses, asterisks, exclamation points, etc.

The invention provides other tools for risk and order management. For example, in a trading system in which credit may be established between a trading party and potential counterparties for trading of interests, trading party stations, for example trading party stations associated with individual traders associated with the trading party, or trading stations associated with trading party administrators, may display warnings when remaining portions of credit limits associated with one or more designated counterparties or types of interests drop below designated levels. For example, warnings may be displayed at such trading parties stations when, during the course of trading activity, available portions of credit limits associated one or more forward time periods in a foreign exchange forwards trading system are less than or equal to 20%, 15%, 10%, and/or 5% of their designated maximum levels.

For example, in the POWERMATCH FX system completion of a transaction causes host computer 26 to update an available portion of a corresponding credit limit, and to check the amount of available credit against the maximum credit amount. When completion of a transaction reduces an available portion of the credit limit to within 20%, 15%, 10%, and/or 5% of the designated maximum levels, an alert is displayed on the trading party's display 32, reading that "CREDIT ALERT: (applicable percentage) (REMAINING AVAILABLE PORTION AMOUNT) REMAINING IN (CREDIT LIMIT IDENTIFIER)." For example, when available credit drops below 20% in a 100 million dollar credit limit associated with a 3 month EUR-USD forward tenor, the corresponding trading party's display can display a message, in green text, reading "CREDIT ALERT: 20% 20 MILLION REMAINING IN EUR-USD LIMIT." Different warnings can be displayed in different colors. For example, when a minimum level has been reached, such as 5% of the maximum limit, the warning can be displayed in red. Optionally flashing warnings may be used.

The invention also provides improvements in user entitlements, in order to provide useful and flexible trading systems. For example, a user associated with a trading party may be authorized, as for example by an administrative user of a trading party system, or by a user associated with the trading system host computer(s), to only view proposed and accepted transactions, e.g., market books of displayed orders, and not to enter or accept any transaction proposals. The user may be entitled, for example, to view a market book display, but not to enter any commands which would financially commit a trading party to any obligations.

In the POWERMATCH FX system, a trading party administrator may authorize a user of a trading party station 22 to view market display and trading activity, but not to trade, by accessing an interface screen such as that depicted in FIG. 12, selecting input field 495, and entering a "N" to indicate that the user is not authorized to trade. Upon entry of such data an identifier associated with the affected user is sent to host computer 26, which creates or modifies a suitable user profile data record with a flag which will prevent the identified user from being presented with order input or acceptance screens such as screen portions 125 of FIG. 3, 171 of FIG. 6, or 185 of FIGS. 8 and 9, and/or otherwise blocking attempted trading activity by the user. Setting flag 495 to "Y" enables the identified user to trade as described herein.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect, or import of the methods described.

The invention provides methods, computer systems, including network computer systems, and computer program products for implementing the inventive methods and processes described herein. Such computer program products comprise computer-usable media having computer-readable codes embodied therein that cause a computer to effect methods and processes incorporating the invention, as described herein.

What is claimed is:

1. A method of presenting on a display device of a trading party station terms for a proposed transaction in a forwards contract for interests traded over a network, the forwards contract having associated therewith a near date, a far date and a notional amount of principal nominally to be paid at the far date of the contract, the terms for the proposed transaction being provided to the trading party station by at least one computer, the trading party station comprising a computer coupled to the display device and to an input device by means of which a proposed transaction in a forwards contract can be selected at the trading party station, the trading party station and the at least one computer communicating over the network, the method comprising:

the at least one computer providing to and the trading party station displaying in a first screen on the display device a proposed forwards contract transaction of a party other than the trading party, the proposed transaction displayed on the display device being selectable via the input device;

in response to selection at the trading party station via the input device of the proposed transaction, the at least one computer providing to and the trading party station displaying on the display device a trade confirmation screen with terms of the selected proposed transaction, including: (i) an identification of the interest, (ii) a near date, (iii) a far date, (iv) a price, and (v) a price indicator item that indicates whether the price being displayed is a notional amount, or an amount indicating a present value of the notional amount at the far date;

in response to selection of the price indicator item in the trade confirmation screen displayed on the display device via the input device, changing the trade confirmation screen to display (i) the present value amount in the event that the notional amount is being displayed upon selection of the price indicator item, and (ii) the notional amount in the event that the present value amount is being displayed upon selection of the price indicator item;

the trade confirmation screen also including a trade acceptance indicator item and a trade rejection indicator item, the trade acceptance indicator item and the trade rejection indicator item being selectable at the trading party station via the input device;

in response to selection of the trade acceptance indicator item in the trade confirmation screen displayed on the display device via the input device, the at least one computer initiating acceptance of a trade represented by the terms of the proposed transaction displayed on the trade confirmation screen, and in response to selection of the trade rejection indicator item in the trade confirmation screen displayed on the display device via the input device, the at least one computer not initiating acceptance of the trade represented by the terms of the proposed transaction displayed on the trade confirmation screen; and displaying in the trade confirmation screen displayed on the display device the amount indicating the present value at least when the item selection made via the input device is for changing the trade confirmation screen to display the present value amount.

2. A method of presenting on a display device of a trading party station terms for a proposed transaction in a forwards contract for interests traded over a network, the forwards contract having associated therewith a near date, a far date and a notional amount of principal nominally to be paid at the far date of the contract, the terms for the proposed transaction being provided to the trading party station by at least one computer, the trading party station comprising a computer coupled to the display device and to an input device by means of which a proposed transaction in a forwards contract can be selected at the trading party station, the trading party station and the at least one computer communicating over the network, the method comprising:

the at least one computer providing to and the trading party station displaying in a first screen on the display device a proposed forwards contract transaction of a party other than the trading party, the proposed transaction displayed on the display device being selectable via the input device;

in response to selection at the trading party station via the input device of the proposed transaction, the at least one computer providing to and the trading party station displaying on the display device a trade confirmation screen with terms of the selected proposed transaction, including: (i) an identification of the interest, (ii) a near date, (iii) a far date, (iv) a price, and (v) a price indicator item that indicates whether the price being displayed is a notional amount, or an amount determined using the formula: displayed price=P*(1+R)(n/b), where: P=notional amount; R=interest rate according to terms of the proposed transaction; n=number of days from near date to far date; b=basis specified according to terms of the proposed transaction;

in response to selection of the price indicator item in the trade confirmation screen displayed on the display device via the input device, changing the trade confirmation screen to display (i) the determined amount in the event that the notional amount is being displayed upon selection of the price indicator item, and (ii) the notional amount in the event that the determined amount is being displayed upon selection of the price indicator item;

the trade confirmation screen also including a trade acceptance indicator item and a trade rejection indicator item, the trade acceptance indicator item and the trade rejection indicator item being selectable at the trading party station via the input device;

in response to selection of the trade acceptance indicator item, in the trade confirmation screen displayed on the display device via the input device, the at least one computer initiating acceptance of a trade represented by the terms of the proposed transaction displayed on the trade confirmation screen, and in response to selection of the trade rejection indicator item in the trade confirmation screen displayed on the display device via the input device, the at least one computer initiating acceptance of the trade represented by the terms of the proposed transaction displayed on the trade confirmation screen; and displaying in the trade confirmation screen displayed on the display device the determined amount according to the formula at least when the item selection made via the input device is for changing the trade confirmation screen to display the determined amount.

3. A system which presents terms for a proposed transaction in a forwards contract for interests traded over a network, the forwards contract having associated therewith a near date, a far date and a notional amount of principal nominally to be paid at the far date of the contract, the system comprising at least one computer, a plurality of trading party stations each including a computer, a display device and an input device by means of which a proposed transaction in a forwards contract can be selected at the trading party station, the trading party stations and the at least one computer communicating over the network, and computer programming that is stored on at least one computer readable medium and that is operable for causing at least:

the at least one computer to provide to and the trading party station to display in a first screen on the display device a proposed forwards contract transaction of a party other than the trading party, the proposed transaction displayed on the display device being selectable via the input device;

in response to selection at the trading party station via the input device of the proposed transaction, the at least one computer to provide to and the trading party station to display on the display device a trade confirmation screen with terms of the selected proposed transaction, including: (i) an identification of the interest, (ii) a near date, (iii) a far date, (iv) a price, and (v) a price indicator item that indicates whether the price being displayed is a notional amount, or an amount indicating a present value of the notional amount at the far date;

in response to selection of the price indicator item in the trade confirmation screen displayed on the display device via the input device, at least one of the at least one computer and the computer changing the trade confirmation screen to display (i) the present value amount in the event that the notional amount is being displayed upon selection of the price indicator item, and (ii) the notional amount in the event that the present value amount is being displayed upon selection of the price indicator item;

the trade confirmation screen also including a trade acceptance indicator item and a trade rejection indicator item, the trade acceptance indicator item and the trade rejection indicator item being selectable at the trading party station via the input device;

in response to selection of the trade acceptance indicator item in the trade confirmation screen displayed on the display device via the input device, the at least one computer initiating acceptance of a trade represented by the terms of the proposed transaction displayed on the trade confirmation screen, and in response to selection of the trade rejection indicator item in the trade confirmation screen displayed on the display device via the input device, the at least one computer not initiating acceptance of the trade represented by the terms of the proposed transaction displayed on the trade confirmation screen; and at least one of the at least one computer and the computer causing the trading party station to display in the trade confirmation screen displayed on the display device the amount indicating the present value at least when the item selection made via the input device is for changing the trade confirmation screen to display the present value amount.

4. A system which presents terms for a proposed transaction in a forwards contract for interests traded over a network, the forwards contract having associated therewith a near date, a far date and a notional amount of principal nominally to be paid at the far date of the contract, the system comprising at least one computer, a plurality of trading party stations each including a computer, a display device and an input device by means of which a proposed transaction in a forwards contract can be selected at the trading party station, the trading party stations and the at least one computer communicating over the network, and computer programming that is stored on at least one computer readable medium and that is operable for causing at least: the at least one computer to provide to and the trading party station to display in a first screen on the display device a proposed forwards contract transaction of a party other than the trading party, the proposed transaction displayed on the display device being selectable via the input device;

in response to selection at the trading party station via the input device of the proposed transaction, the at least one computer to provide to and the trading party station to display on the display device a trade confirmation screen with terms of the selected proposed transaction, including: (i) an identification of the interest, (ii) a near date, (iii) a far date, (iv) a price, and (v) a price indicator item that indicates whether the price being displayed is a notional amount, or an amount determined using the formula: displayed price=$P*(1+R)(n/b)$, where: P=notional amount; R=interest rate according to terms of the proposed transaction; n=number of days from near date to far date; b=basis specified according to terms of the proposed transaction;

in response to selection of the price indicator item in the trade confirmation screen displayed on the display device via the input device, at least one of the at least one computer and the computer changing the trade confirmation screen to display (i) the determined amount in the event that the notional amount is being displayed upon selection of the price indicator item, and (ii) the notional amount in the event that the determined amount is being displayed upon selection of the price indicator item;

the trade confirmation screen also including a trade acceptance indicator item and a trade rejection indicator item, the trade acceptance indicator item and the trade rejection indicator item being selectable at the trading party station via the input device;

in response to selection of the trade acceptance indicator item in the trade confirmation screen displayed on the display device via the input device, the at least one computer initiating acceptance of a trade represented by the terms of the proposed transaction displayed on the trade confirmation screen, and in response to selection of the trade rejection indicator item in the trade confirmation screen displayed on the display device via the input device, the at least one computer not initiating acceptance of the trade represented by the terms of the proposed transaction displayed on the trade confirmation screen; and at least one of the at least one computer and the computer causing the trading party station to display in the trade confirmation screen displayed on the display device the determined amount at least when the item selection made via the input device is for changing the trade confirmation screen to display the determined amount.

5. A computer readable medium or media having programming stored thereon for causing a computer system to present terms for a proposed transaction in a forwards contract for interests traded over a network, the forwards contract having associated therewith a near date, a far date and a notional amount of principal nominally to be paid at the far date of the contract, the system comprising at least one computer, a plurality of trading party stations each including a computer, a display device and an input device by means of which a proposed transaction in a forwards contract can be selected at the trading party station, the trading party stations and the at least one computer communicating over the network, the programming, when executed, operable for causing the computer system to carry out a method comprising:

the at least one computer providing to and the trading party station displaying in a first screen on the display device a proposed forwards contract transaction of a party other than the trading party, the proposed transaction displayed on the display device being selectable via the input device;

in response to selection at the trading party station via the input device of the proposed transaction, the at least one computer providing to and the trading party station displaying on the display device a trade confirmation screen with terms of the selected proposed transaction, including: (i) an identification of the interest, (ii) a near date, (iii) a far date, (iv) a price, and (v) a price indicator item that indicates whether the price being displayed is a notional amount, or an amount indicating a present value of the notional amount at the far date;

in response to selection of the price indicator item in the trade confirmation screen displayed on the display device via the input device, changing the trade confirmation screen to display (i) the present value amount in the event that the notional amount is being displayed upon selection of the price indicator item, and (ii) the notional amount in the event that the present value amount is being displayed upon selection of the price indicator item;

the trade confirmation screen also including a trade acceptance indicator item and a trade rejection indicator item, the trade acceptance indicator item and the trade rejection indicator item being selectable at the trading party station via the input device;

in response to selection of the trade acceptance indicator item in the trade confirmation screen displayed on the display device via the input device, the at least one computer initiating acceptance of a trade represented by the terms of the proposed transaction displayed on the trade confirmation screen, and in response to selection of the trade rejection indicator item in the trade confirmation screen displayed on the display device via the input device, the at least one computer not initiating acceptance of the trade represented by the terms of the proposed transaction displayed on the trade confirmation screen; and displaying in the trade confirmation screen displayed on the display device the amount indicating the present value at least when the item selection made via the input device is for changing the trade confirmation screen to display the present value amount.

6. A computer readable medium or media having programming stored thereon for causing a computer system to present terms for a proposed transaction in a forwards contract for interests traded over a network, the forwards contract having associated therewith a near date, a far date and a notional amount of principal nominally to be paid at the far date of the contract, the system comprising at least one computer, a plurality of trading party stations each including a computer, a display device and an input device by means of which a proposed transaction in a forwards contract can be selected at the trading party station, the trading party stations and the at least one computer communicating over the network, the programming, when executed, operable for causing the computer system to carry out a method comprising:

the at least one computer providing to and the trading party station displaying in a first screen on the display device a proposed forwards contract transaction of a party other than the trading party, the proposed transaction displayed on the display device being selectable via the input device;

in response to selection at the trading party station via the input device of the proposed transaction, the at least one computer providing to and the trading party station displaying on the display device a trade confirmation screen with terms of the selected proposed transaction, including: (i) an identification of the interest, (ii) a near date, (iii) a far date, (iv) a price, and (v) a price indicator item that indicates whether the price being displayed is a notional amount, or an amount determined using the formula: displayed price=$P*(1+R)(n/b)$, where: P=notional amount; R=interest rate according to terms of the proposed transaction; n=number of days from near date to far date; b=basis specified according to terms of the proposed transaction;

in response to selection of the price indicator item in the trade confirmation screen displayed on the display device via the input device, changing the trade confirmation screen to display (i) the determined amount in the event that the notional amount is being displayed upon selection of the price indicator item, and (ii) the notional amount in the event that the determined amount is being displayed upon selection of the price indicator item;

the trade confirmation screen also including a trade acceptance indicator item and a trade rejection indicator item, the trade acceptance indicator item and the trade rejection indicator item being selectable at the trading party station via the input device;

in response to selection of the trade acceptance indicator item, in the trade confirmation screen displayed on the display device via the input device, the at least one computer initiating acceptance of a trade represented by the terms of the proposed transaction displayed on the trade confirmation screen, and in response to selection of the trade rejection indicator item in the trade confirmation screen displayed on the display device via the input device, the at least one computer initiating acceptance of the trade represented by the terms of the proposed transaction displayed on the trade confirmation screen; and displaying in the trade confirmation screen displayed on the display device the determined amount according to the formula at least when the item selection made via the input device is for changing the trade confirmation screen to display the determined amount.

* * * * *